US012770569B2

(12) United States Patent
Jeon et al.

(10) Patent No.: US 12,770,569 B2
(45) Date of Patent: Oct. 20, 2026

(54) DISPLAY AND ELECTRONIC DEVICE FOR PERFORMING MULTIPLE ADJUSTMENTS OF THRESHOLD VOLTAGE OF DRIVING TRANSISTOR

(71) Applicant: Samsung Electronics Co., Ltd., Suwon-si (KR)

(72) Inventors: Namhyeon Jeon, Suwon-si (KR); Sungwon Ryu, Suwon-si (KR); Gyudong Eom, Suwon-si (KR); Dongseop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/358,872

(22) Filed: Oct. 15, 2025

(65) Prior Publication Data

US 2026/0038442 A1 Feb. 5, 2026

Related U.S. Application Data

(63) Continuation of application No. PCT/KR2024/002759, filed on Mar. 4, 2024.

(30) Foreign Application Priority Data

Apr. 24, 2023 (KR) ........................ 10-2023-0053643
Jun. 28, 2023 (KR) ........................ 10-2023-0083618

(51) Int. Cl.
*G09G 3/3233* (2016.01)
*G09G 3/20* (2006.01)

(52) U.S. Cl.
CPC ......... *G09G 3/3233* (2013.01); *G09G 3/2074* (2013.01); *G09G 2300/0804* (2013.01);
(Continued)

(58) Field of Classification Search
CPC ......... G09G 3/2074; G09G 2300/0804; G09G 2300/0819; G09G 2300/0852;
(Continued)

(56) References Cited

U.S. PATENT DOCUMENTS 10,255,855 B2 4/2019 Park et al.
11,322,093 B2 5/2022 Park et al.
(Continued)

FOREIGN PATENT DOCUMENTS

CN 115359759 A 11/2022
KR 10-2018-0079082 A 7/2018
(Continued)

OTHER PUBLICATIONS

International Search Report dated Jun. 18, 2024, issued in an International Application No. PCT/KR2024/002759.

*Primary Examiner* — Hang Lin
(74) *Attorney, Agent, or Firm* — Jefferson IP Law, LLP

(57) ABSTRACT

An electronic device is provided. The electronic device includes a display driver circuitry, and a display panel including a plurality of sub-pixels, wherein each of the sub-pixels includes a light emitting element, and a driving transistor configured to obtain a current provided to the light emitting element, and wherein the display driver circuitry is configured to display a first image on the display panel, before the light emitting element is emit for displaying a second image subsequent to the first image, initialize a gate electrode of the driving transistor, and apply a bias voltage to a source electrode of the driving transistor that the gate electrode is initialized, after the bias voltage is applied to the source electrode, initialize the gate electrode again, apply a data voltage to the gate electrode initialized again, and cause the light emitting element to emit light for the displaying of
(Continued)

the second image by providing a current according to the data voltage to the light emitting element.

20 Claims, 15 Drawing Sheets

(52) U.S. Cl.
CPC ............... *G09G 2300/0819* (2013.01); *G09G 2300/0852* (2013.01); *G09G 2300/0861* (2013.01); *G09G 2310/06* (2013.01); *G09G 2310/08* (2013.01); *G09G 2320/0233* (2013.01); *G09G 2320/0257* (2013.01); *G09G 2330/023* (2013.01)

(58) Field of Classification Search
CPC ....... G09G 2300/0861; G09G 2310/06; G09G 2310/08; G09G 2320/0233; G09G 2320/0257; G09G 2330/023; G09G 3/3233
See application file for complete search history.

(56) References Cited

U.S. PATENT DOCUMENTS

| | | | | |
|---|---|---|---|---|
| 11,640,794 | B2 | 5/2023 | Yang et al. | |
| 11,810,517 | B2 | 11/2023 | Park et al. | |
| RE49,922 | E | 4/2024 | Lee et al. | |
| 12,243,485 | B2 | 3/2025 | Kim et al. | |
| 12,424,146 | B2 | 9/2025 | Park et al. | |
| 2009/0122053 | A1* | 5/2009 | Yamamoto | G09G 3/3233 345/213 |
| 2009/0195480 | A1* | 8/2009 | Yamamoto | G09G 3/3233 345/55 |
| 2010/0141626 | A1* | 6/2010 | Tomida | G09G 3/3233 345/211 |
| 2023/0237965 | A1 | 7/2023 | Lin et al. | |
| 2023/0252940 | A1 | 8/2023 | Im et al. | |
| 2023/0290308 | A1 | 9/2023 | Chae et al. | |
| 2023/0298526 | A1 | 9/2023 | Zhang et al. | |
| 2025/0037658 | A1 | 1/2025 | Chae et al. | |
| 2025/0061858 | A1 | 2/2025 | Sang et al. | |

FOREIGN PATENT DOCUMENTS

| | | | |
|---|---|---|---|
| KR | 10-2048562 | B1 | 11/2019 |
| KR | 10-2281222 | B1 | 7/2021 |
| KR | 10-2021-0100785 | A | 8/2021 |
| KR | 10-2022-0076872 | A | 6/2022 |
| KR | 10-2022-0151088 | A | 11/2022 |
| KR | 10-2022-0152481 | A | 11/2022 |
| KR | 10-2022-0155537 | A | 11/2022 |
| KR | 10-2023-0017970 | A | 2/2023 |
| KR | 10-2023-0024448 | A | 2/2023 |
| KR | 10-2718156 | B1 | 10/2024 |
| KR | 10-2793763 | B1 | 4/2025 |

* cited by examiner

DISPLAY AND ELECTRONIC DEVICE FOR PERFORMING MULTIPLE ADJUSTMENTS OF THRESHOLD VOLTAGE OF DRIVING TRANSISTOR

CROSS-REFERENCE TO RELATED APPLICATION(S)

This application is a continuation application, claiming priority under 35 U.S.C. § 365(c), of an International application No. PCT/KR2024/002759, filed on Mar. 4, 2024, which is based on and claims the benefit of a Korean patent application number 10-2023-0053643, filed on Apr. 24, 2023, in the Korean Intellectual Property Office, and of a Korean patent application number 10-2023-0083618, filed on Jun. 28, 2023, in the Korean Intellectual Property Office, the disclosure of each of which is incorporated by reference herein in its entirety.

BACKGROUND

1. Field

The disclosure relates to a display and an electronic device that performs multiple adjustments of a threshold voltage of a driving transistor.

2. Description of Related Art

An electronic device may include a processor, display driver circuitry, and a display panel. For example, the display driver circuitry may display, on the display panel, an image obtained by the processor. For example, the display panel may include a plurality of sub-pixels to display the image. For example, each of the plurality of sub-pixels may include a light emitting diode and a driving transistor configured to obtain a current provided to the light emitting diode.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display and an electronic device that performs multiple adjustments of a threshold voltage of a driving transistor.

Additional aspects will be set forth in part in the description which follows and, in part, will be apparent from the description, or may be learned by practice of the presented embodiments.

In accordance with an aspect of the disclosure, an electronic device is provided. The electronic device includes display driver circuitry, and a display panel including a plurality of sub-pixels, wherein each of the sub-pixels includes a light emitting element, and a driving transistor configured to obtain a current provided to the light emitting element, and wherein the display driver circuitry is configured to display a first image on the display panel, before the light emitting element emits for displaying of a second image subsequent to the first image, initialize a gate electrode of the driving transistor, and apply a bias voltage to a source electrode of the driving transistor that the gate electrode is initialized, after the bias voltage is applied to the source electrode, initialize the gate electrode again, apply a data voltage to the gate electrode initialized again, and cause the light emitting element to emit light for the displaying of the second image by providing a current according to the data voltage to the light emitting element.

In accordance with another aspect of the disclosure, an electronic device is provided. The electronic device includes display driver circuitry. The electronic device includes a display panel including a plurality of sub-pixels. Each of the sub-pixels includes a light emitting diode. Each of the sub-pixels includes a driving transistor configured to obtain a current provided to the light emitting diode. The display driver circuitry is configured to display a first image on the display panel. The display driver circuitry is configured to execute multiple adjustments of a threshold voltage of the driving transistor that each includes, before the light emitting diode is emitted for displaying of a second image subsequent to the first image, initializing a gate electrode of the driving transistor, and applying a bias voltage to a source electrode of the driving transistor. The display driver circuitry is configured to initialize the gate electrode after the multiple adjustments are executed. The display driver circuitry is configured to apply a data voltage to the gate electrode initialized after the multiple adjustments are executed. The display driver circuitry is configured to emit the light emitting diode for the displaying of the second image by providing a current according to the data voltage to the light emitting diode.

In accordance with another aspect of the disclosure, a display is provided. The display includes display driver circuitry. The display includes a display panel including a plurality of sub-pixels. Each of the sub-pixels includes a light emitting element. Each of the sub-pixels includes a driving transistor configured to obtain a current provided to the light emitting element. The display driver circuitry is configured to display a first image on the display panel. The display driver circuitry is configured to, before the light emitting element is emitted for displaying of a second image subsequent to the first image, initialize a gate electrode of the driving transistor, and apply a bias voltage to a source electrode of the driving transistor that the gate electrode is initialized. The display driver circuitry is configured to, after the bias voltage is applied to the source electrode, initialize the gate electrode again. The display driver circuitry is configured to apply a data voltage to the gate electrode initialized again. The display driver circuitry is configured to emit the light emitting element for the displaying of the second image by providing a current according to the data voltage to the light emitting element.

In accordance with another aspect of the disclosure, a display is provided. The display includes display driver circuitry. The display includes a display panel including a plurality of sub-pixels. Each of the sub-pixels includes a light emitting diode. Each of the sub-pixels includes a driving transistor configured to obtain a current provided to the light emitting diode. The display driver circuitry is configured to display a first image on the display panel. The display driver circuitry is configured to execute multiple adjustments of a threshold voltage of the driving transistor that each includes, before the light emitting diode is emitted for displaying of a second image subsequent to the first image, initializing a gate electrode of the driving transistor, and applying a bias voltage to a source electrode of the driving transistor. The display driver circuitry is configured to initialize the gate electrode after the multiple adjustments are executed. The display driver circuitry is configured to apply a data voltage to the gate electrode initialized after the multiple adjustments are executed. The display driver circuitry is configured to emit the light emitting diode for the displaying of the second image by providing a current according to the data voltage to the light emitting diode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
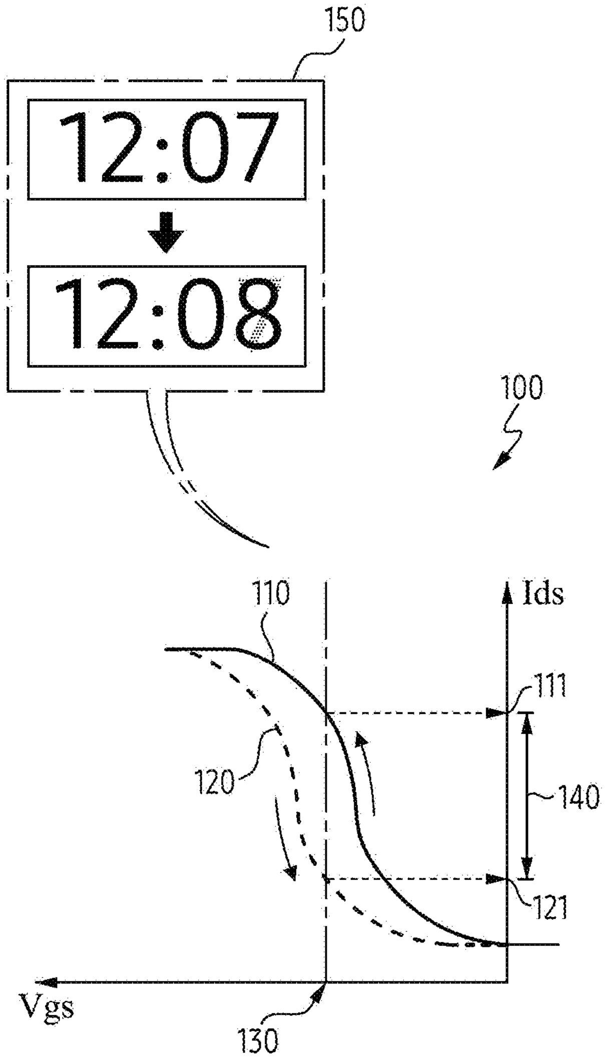
FIG. 1 illustrates an example of an afterimage according to hysteresis in a driving transistor according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device may display an image based on a refresh rate. For example, the refresh rate may be adaptively changed. For example, the electronic device may lower the refresh rate in order to reduce power consumed by displaying an image on a display panel. For example, the electronic device may change the refresh rate from a first refresh rate to a second refresh rate lower than the first refresh rate. For example, providing the second refresh rate may reduce power consumed by displaying an image on a display panel, but an afterimage (image sticking, image retention, or image persistence) may occur while providing the second refresh rate. For example, a probability that the afterimage is caused while providing the second refresh rate may be higher than a probability that the afterimage is caused while providing the first refresh rate. For example, the display panel may include a plurality of sub-pixels. For example, each of the sub-pixels may include a light emitting diode (e.g., organic light emitting diode (OLED)) and a driving transistor for providing a current to the light emitting diode. For example, the afterimage may be caused by hysteresis in the driving transistor. The hysteresis and the afterimage may be exemplified through FIG. 1.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth© chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates an example of an afterimage according to hysteresis in a transistor according to an embodiment of the disclosure.

Referring to FIG. 1, a threshold voltage of the driving transistor may be shifted when an image of a first color (e.g., black) is changed to an image of a second color (e.g., white).

For example, the threshold voltage may indicate a minimum gate-to-source voltage (Vgs) of the driving transistor (e.g., field effect transistor (FET)) required to generate a conducting path between a source (or source terminal, or source electrode) and a drain (or drain terminal, or drain electrode) of the driving transistor.

For example, the shifting of the threshold voltage may cause a change in a luminance provided by the light-emitting diode driven through the driving transistor. For example, the threshold voltage may be gradually shifted while displaying of the image of the first color is maintained. For example, the threshold voltage gradually shifted while displaying the image of the first color is maintained may be applied when the image of the second color changed from the image of the first color is displayed. For example, when the image of the first color is changed to the image of the second color, an afterimage may occur due to a change in luminance.

For example, a chart 100 indicates the change. A horizontal axis of the chart 100 indicates a gate-to-source voltage (Vgs) of the transistor, and a vertical axis of the chart 100 indicates a current (Ids) applied to the light emitting diode. For example, a line 110 in the chart 100 indicates a relationship between the gate-to-source voltage (Vgs) and the current (Ids) for the image of the first color, and a line 120 in the chart 100 indicates a relationship between the gate-to-source voltage (Vgs) and the current (Ids) for the image of the second color. Like the chart 100, the line 120 may be offset with respect to the line 110. For example, a value 111 of the current (Ids) at the line 110 when the gate-to-source voltage (Vgs) is a value 130 may be different from a value 121 of the current (Ids) at the line 120 when the gate-to-source voltage (Vgs) is the value 130. A difference 140 between the value 111 and the value 121 may cause the afterimage. The afterimage represented as a state 150 in which the first color is changed to the second color may be caused by the difference 140.

A display and an electronic device including the display to be illustrated below may execute operations for reducing the occurrence of the afterimage. For example, the display and the electronic device may execute multiple adjustments of a threshold voltage of a driving transistor to reduce the occurrence of the afterimage. Components for executing the multiple adjustments may be exemplified in the description of FIG. 2.

Figure 2:
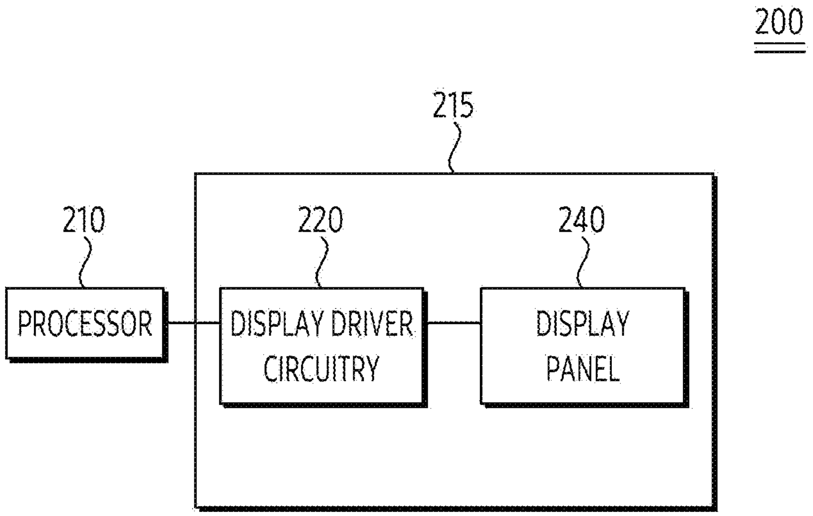
FIG. 2 is a simplified block diagram of an embodiment of an electronic device according to an embodiment of the disclosure.

FIG. 2 is a simplified block diagram of an embodiment of an electronic device according to an embodiment of the disclosure.

Referring to FIG. 2, an electronic device 200 may include a processor 210 and a display 215. The display 215 may include display driver circuitry 220 and a display panel 240.

For example, the processor 210 may be used to generate or obtain an image to be displayed on the display panel 240. For example, the processor 210 may provide the image to the display driver circuitry 220. For example, the processor 210 may include at least a portion of the processor 1320 of FIG. 13 or may correspond to at least a portion of the processor 1320 of FIG. 13.

For example, the display driver circuitry 220 may be used to display, on the display panel 240, the image obtained from the processor 210. For example, the display driver circuitry 220 may execute multiple displays of the image on the display panel 240 to maintain the image on the display panel 240. For example, a portion of the multiple displays may be executed based on an address scan. For example, another portion of the multiple displays may be executed based on a self-scan. As a non-limiting example, the address scan may include initializing a gate electrode (or gate electrode terminal) of the driving transistor, applying a data voltage to the initialized gate electrode, and providing a current to the light emitting diode through the driving transistor in which the data voltage is applied to the gate electrode. As a non-limiting example, unlike the address scan, the self-scan may include, providing a current to the light emitting diode through the driving transistor, from among initializing the gate electrode, applying the data voltage to the initialized gate electrode, and providing a current to the light emitting diode through the driving transistor.

For example, the address scan may include executing multiple adjustments of the threshold voltage of the driving transistor to be exemplified below. As a non-limiting example, the address scan may include executing a single adjustment instead of executing the multiple adjustments. For example, the self-scan may include executing one or more adjustments of the threshold voltage of the driving transistor to be exemplified below.

Figure 14:
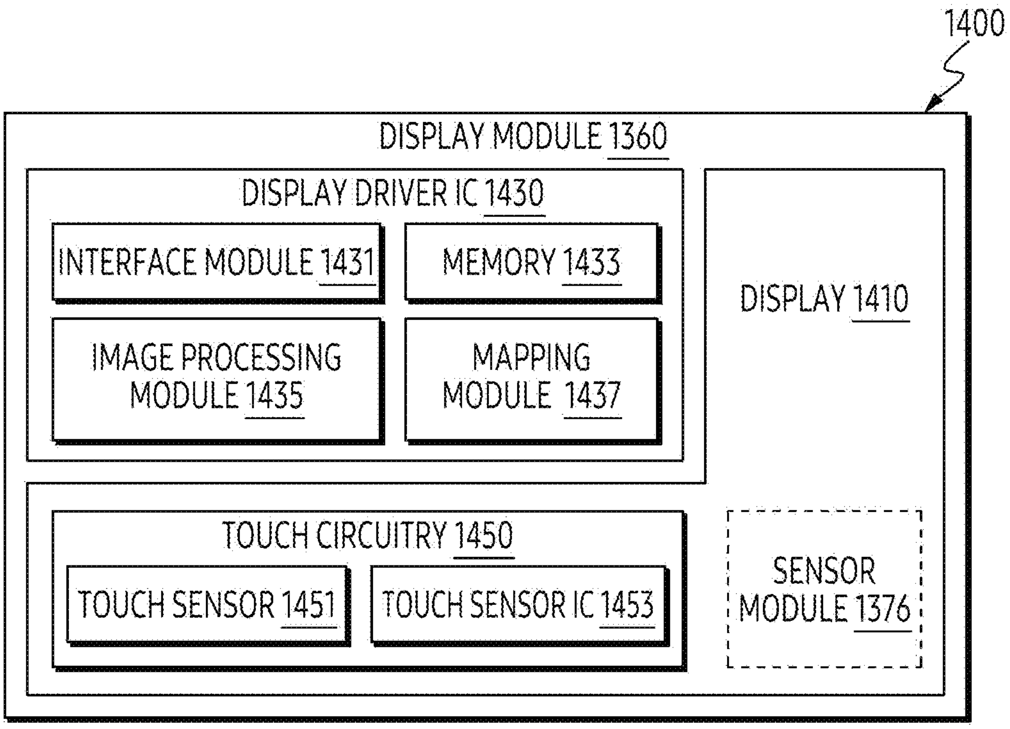
FIG. 14 is a block diagram of a display module according to an embodiment of the disclosure.

For example, the display driver circuitry 220 may include at least a portion of the display driver integrated circuit (DDI) 1430 of FIG. 14, or may correspond to at least a portion of the DDI 1430.

For example, the display panel 240 may include a plurality of sub-pixels. For example, each of the plurality of sub-pixels may include a light emitting diode (e.g., OLED) and a driving transistor for providing a current to the light emitting diode (or driving transistor for driving the light emitting diode). For example, the driving transistor may be used to obtain a current provided to the light emitting diode. For example, each of the sub-pixels may include an operation control transistor that includes a drain (or a drain terminal, or drain electrode) connected to a source (or a source terminal, or source electrode) of the driving transistor and a source (or source terminal, or source electrode) connected to a driving voltage line transmitting a driving voltage (VDD). For example, each of the sub-pixels may include a light emitting control transistor that includes a source electrode connected to the drain electrode of the driving transistor and a drain electrode connected to an anode of the light emitting diode. For example, the display driver circuitry 220 may provide, to a gate electrode of each of the operation control transistor and the light emitting control transistor, a light emitting signal for transmitting the current to the light emitting diode. When the light emitting signal is provided to the operation control transistor and the light emitting control transistor, the current may be provided to the light emitting diode. The light emitting diode may be emitted based on the current. For example, the display panel 240 may include at least a portion of the display 1410 of FIG. 14, or may correspond to at least a portion of the display 1410 of FIG. 14.

For example, the display driver circuitry 220 may display an image received from the processor 210 on the display panel 240, based on the address scan including the multiple adjustments, to reduce the afterimage. As a non-limiting example, the multiple adjustments may be replaced with a single adjustment.

For example, the display driver circuitry 220 may display the image on the display panel 240 based on the self-scan including the one or more adjustments, to reduce the afterimage.

For example, the display panel 240 may include a plurality of sub-pixels that each include components for the address scan including the single adjustment and/or the self-scan including the one or more adjustments. For example, the display panel 240 may include a plurality of sub-pixels that each include components for the address scan including the multiple adjustments and/or the self-scan including the one or more adjustments. The components for the address scan including the single adjustment and/or the self-scan including the one or more adjustments or the components for the address scan including the multiple adjustments and/or the self-scan including the one or more adjustments may be exemplified in the description of FIG. 3A.

Figure 3A:
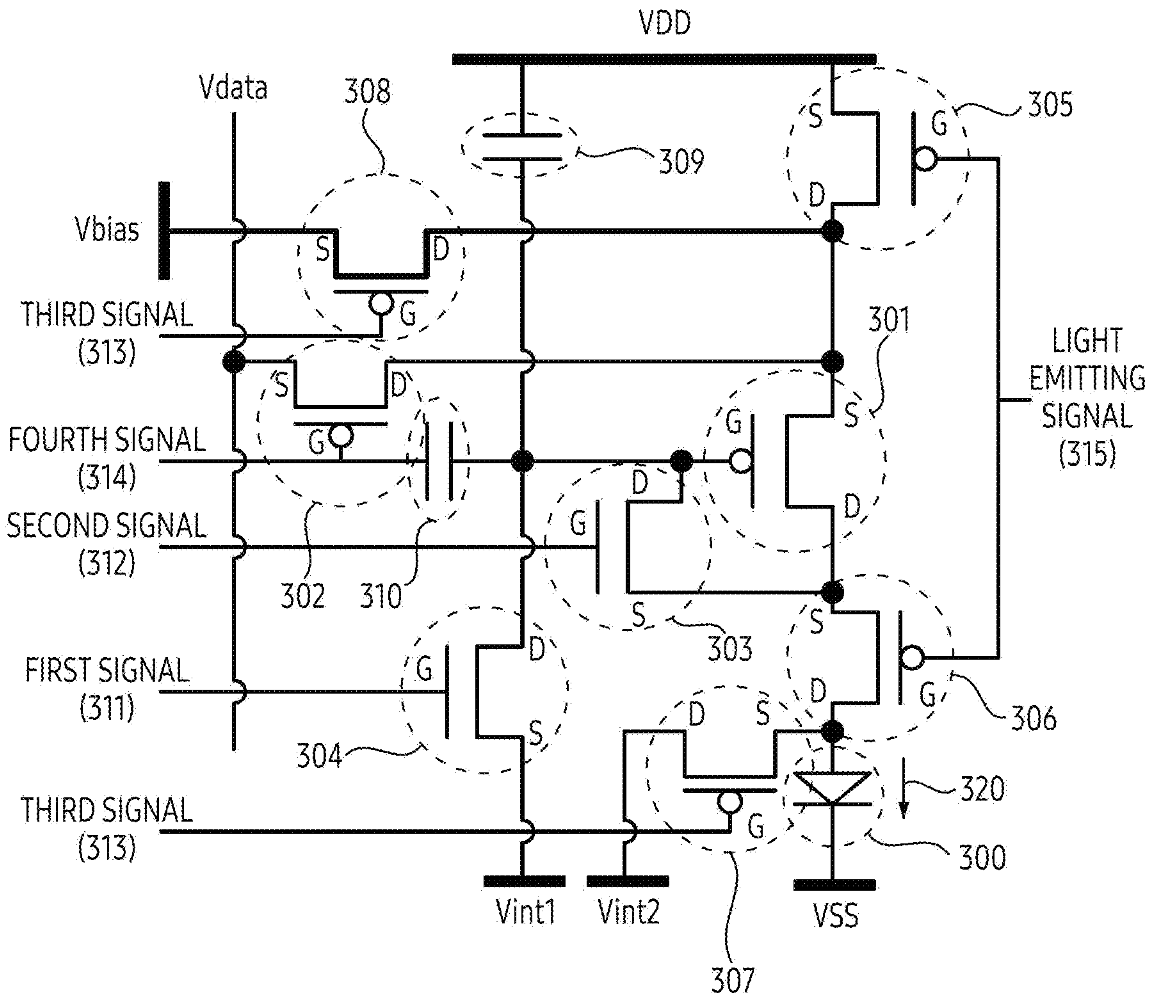
FIG. 3A illustrates an example of each of a plurality of sub-pixels in a display panel according to an embodiment of the disclosure.

FIG. 3A illustrates an example of each of a plurality of sub-pixels in a display panel according to an embodiment of the disclosure.

Referring to FIG. 3A, each of the plurality of sub-pixels may include a light emitting element (e.g., a light emitting diode 300 or an OLED 300), a first transistor 301 (e.g., the driving transistor), a second transistor 302 (e.g., a switching transistor), a third transistor 303 (e.g., a compensation transistor), a fourth transistor 304 (e.g., an initialization transistor), a fifth transistor 305 (e.g., the operation control transistor), a sixth transistor 306 (e.g., the light emitting control transistor), a seventh transistor 307 (e.g., a bypass transistor), an eighth transistor 308 (e.g., a threshold voltage adjustment transistor), a capacitor 309 (e.g., a storage capacitor), and a capacitor 310 (e.g., a boost capacitor). The components within each of the plurality of sub-pixels illustrated in FIG. 3A, their relationships, and their functions are exemplary only and do not limit the implementations described or claimed in the present document.

For example, a gate electrode G of the first transistor 301 may be connected to a drain electrode D of the third transistor 303. For example, the gate electrode G of the first transistor 301 may be connected to a drain electrode D of the fourth transistor 304. For example, the gate electrode of the first transistor 301 may be connected to the capacitor 309 used to store a data voltage (Vdata). For example, the gate electrode of the first transistor 301 may be connected to the capacitor 310 used to compensate for a voltage drop caused by stopping providing a fourth signal 314. For example, a source electrode of the first transistor 301 may be connected to a drain electrode of the second transistor 302. For example, the source electrode of the first transistor 301 may be connected to a drain electrode of the fifth transistor 305. For example, the source electrode of the first transistor 301 may be connected to a drain electrode of the eighth transistor 308. For example, a drain electrode of the first transistor 301 may be connected to a source electrode of the third transistor 303. For example, the drain electrode of the first transistor 301 may be connected to a source electrode of the sixth transistor 306. For example, the first transistor 301 may be used to provide, to the light emitting diode 300, a current 320 according to data voltage (Vdata).

For example, a gate electrode of the second transistor 302 may be configured to receive the fourth signal 314. For example, a source electrode of the second transistor 302 may be configured to obtain a data voltage (Vdata).

For example, a gate electrode of the third transistor 303 may be configured to receive a second signal 312.

For example, a gate electrode of the fourth transistor 304 may be configured to receive a first signal 311. For example, a source electrode of the fourth transistor 304 may be configured to obtain a first initialization voltage (Vint1) (e.g., about −3.5 (V)).

For example, a gate electrode of the fifth transistor 305 may be configured to receive a light emitting signal 315. For example, a source electrode of the fifth transistor 305 may be configured to obtain a first driving voltage (VDD).

For example, a gate electrode of the sixth transistor 306 may be configured to receive a light emitting signal 315. For example, a drain electrode of the sixth transistor 306 may be connected to a source electrode of the seventh transistor 307. For example, the drain electrode of the sixth transistor 306 may be connected to an anode of the light emitting element (i.e., light emitting diode 300).

For example, a gate electrode of the seventh transistor 307 may be configured to receive a third signal 313. For example, a drain electrode of the seventh transistor 307 may be configured to obtain a second initialization voltage (Vint2) (e.g., about −3 (V)).

For example, a gate electrode of the eighth transistor 308 may be configured to receive a third signal 313. For example, the gate electrode of the eighth transistor 308 may be configured to obtain a bias voltage (Vbias) (e.g., about 6 (V)).

For example, a cathode of the light emitting element (i.e., light emitting diode 300) may be configured to obtain a second driving voltage (VSS).

For example, the display driver circuitry 220 may display an image on the display panel 240, based on providing the first signal 311, the second signal 312, the third signal 313, the fourth signal 314, and the light emitting signal 315 to each of the plurality of sub-pixels.

For example, the display driver circuitry 220 may display the image based on the address scan including the single adjustment. Displaying the image based on the address scan including the single adjustment may be exemplified in the description of FIG. 3B.

Figure 3B:
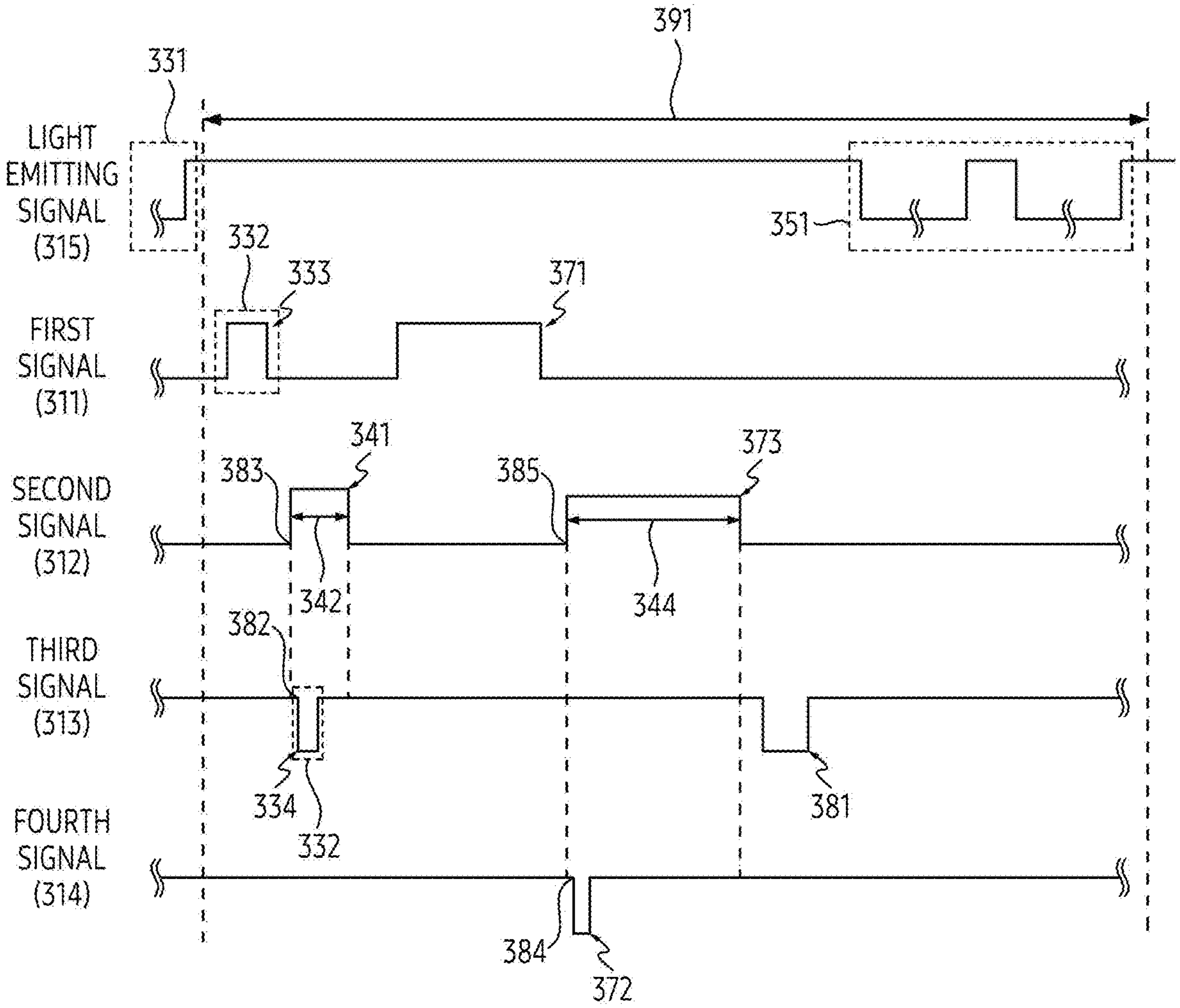
FIG. 3B illustrates an example of a single adjustment of a threshold voltage of a driving transistor that is executed before applying a data voltage to a gate electrode of the driving transistor according to an embodiment of the disclosure.

FIG. 3B illustrates an example of a single adjustment of a threshold voltage of a driving transistor that is executed before applying a data voltage to a gate electrode of the driving transistor according to an embodiment of the disclosure.

Referring to FIG. 3B, the display driver circuitry 220 may display a first image on the display panel 240 by providing a light emitting signal 315 to each of the gate electrode of the fifth transistor 305 and the gate electrode of the sixth transistor 306, as in a state 331.

For example, the display driver circuitry 220 may execute a single adjustment 332 of the threshold voltage of the first transistor 301, before the light emitting diode 300 emits for displaying of a second image subsequent to the first image.

For example, the single adjustment 332 may include initializing the gate electrode of the first transistor 301 and applying a bias voltage (Vbias) to the source electrode of the first transistor 301 in which the gate electrode is initialized. For example, the bias voltage (Vbias) is a voltage set (or determined) for adjusting the threshold voltage of the first transistor 301 and may be about 6 (V). However, it is not limited thereto.

For example, the single adjustment 332 may include initializing the gate electrode of the first transistor 301 with a data voltage used for the displaying of the first image by providing the first signal 311 to the gate electrode of the fourth transistor 304 as in a state 333, and applying a bias voltage (Vbias) to the source electrode of the first transistor 301, in which the gate electrode is initialized, by providing the third signal 313 to the gate electrode of the eighth transistor 308.

For example, applying a bias voltage (Vbias) by providing the third signal 313 within the single adjustment 332 may be executed after initializing the gate electrode of the first transistor 301 within the single adjustment 332 to reduce the afterimage. For example, applying a bias voltage (Vbias) by providing the third signal 313 within the single adjustment 332 may be executed on a condition that initializing the gate electrode of the first transistor 301 within the single adjustment 332 is executed.

For example, applying a bias voltage (Vbias) by providing the third signal 313 within the single adjustment 332 may be executed, while the gate electrode of the first transistor 301 is connected to the drain electrode of the first transistor 301 through the third transistor 303 by providing the second signal 312 to the gate electrode of the third transistor 303, as in a state 341. For example, applying a bias voltage (Vbias) to the source electrode of the first transistor 301 within the single adjustment 332 may be executed within a section 342 that provides the second signal 312 as in the state 341 so that a current from the source electrode of the first transistor 301 to the drain electrode of the first transistor 301 flows to the capacitor 309 through the third transistor 303. For example, applying a bias voltage (Vbias) to the source electrode of the first transistor 301 within the single adjustment 332 may be executed within a section 342 to enhance the adjustment (or initialization) of the threshold voltage of the first transistor 301. As a non-limiting example, a start timing 382 of providing the third signal 313 (or providing the third signal 313 within the single adjustment 332) as in the state 333 may be a timing immediately after a start timing 383 of providing the second signal 312 as in the state 341. For example, the display driver circuitry 220 may provide the third signal 313, in response to connecting the gate electrode of the first transistor 301 to the drain electrode of the first transistor 301 through the third transistor 303 (or as soon as the gate electrode of the first transistor 301 is connected to the drain electrode of the first transistor 301 through the third transistor 303). For example, providing the third signal 313 may be executed in response to providing the second signal 312 so that a current flows from the source electrode of the first transistor 301 to the drain electrode of the first transistor 301.

For example, since the third signal 313 is provided to the gate electrode of the seventh transistor 307 as well as the gate electrode of the eighth transistor 308, the anode of the light emitting diode 300 may be initialized based on the second initialization voltage (Vint2) while a bias voltage (Vbias) is applied to the source electrode of the first transistor 301 within the single adjustment 332. For example, the initialization of the anode may be implemented to enhance the expression of black (or black color) using the light emitting diode 300.

For example, the display driver circuitry 220 may initialize the gate electrode of the first transistor 301 having a voltage according to the bias voltage (Vbias) applied within the single adjustment 332 (e.g., a voltage reduced by the threshold voltage from the bias voltage (Vbias)) by providing the first signal 311 to the gate electrode of the fourth transistor 304 as in a state 371 after the single adjustment 332 is executed. As a non-limiting example, time for providing the first signal 311 as in the state 371 may be longer than time for providing the first signal 311 as in the state 333. For example, time for initializing (e.g., the state 333) the gate electrode of the first transistor 301 within the single adjustment 332 may be shorter than time for initializing (e.g., the state 371) the gate electrode of the first transistor 301 outside the single adjustment 332 (or for initializing the gate electrode of the first transistor 301 before applying a data voltage (Vdata)). For example, since initializing the gate electrode of the first transistor 301 within the single adjustment 332 is different from initializing the first transistor 301 immediately before applying a data voltage (Vdata), time for initializing (e.g., state 333) the gate electrode of the first transistor 301 within the single adjustment 332 may be shorter than time for initializing the gate electrode of the first transistor 301 outside the single adjustment 332.

For example, the display driver circuitry 220 may apply a data voltage (Vdata) to the gate electrode of the first transistor 301 initialized after the single adjustment 332 is executed (e.g., the gate electrode of the first transistor 301 initialized by providing the first signal 311 as in the state 371), by providing the fourth signal 314 to each of the gate electrode of the first transistor 301 and the gate electrode of the second transistor 302 as in the state 372. As a non-limiting example, time for applying the data voltage (Vdata) may be up to about 5 microseconds (us).

For example, applying a data voltage (Vdata) by providing the fourth signal 314 may be executed, while the gate electrode of the first transistor 301 is connected to the drain electrode of the first transistor 301 through the third transistor 303 by providing the second signal 312 to the gate electrode of the third transistor 303 as in a state 373. For example, applying the data voltage (Vdata) may be executed within a section 344 that provides the second signal 312 as in the state 373. As a non-limiting example, a start timing 384 of providing the fourth signal 314 as in the state 372 may be a timing immediately after a start timing 385 of providing the second signal 312 as in the state 373. For example, since applying the data voltage (Vdata) should be executed within a time interval for displaying of the second image, the display driver circuitry 220 may provide a fourth signal 314, in response to connecting the gate electrode of the first transistor 301 to the drain electrode of the first transistor 301 through the third transistor 303 (or as soon as the gate electrode of the first transistor 301 is connected to the drain electrode of the first transistor 301 through the third transistor 303). For example, time for providing the fourth signal 314 may be up to 5 (us).

For example, the display driver circuitry 220 may cause the light emitting diode 300 to emit light for the displaying of the second image, by providing a current (e.g., the current 320 of FIG. 3A) according to the data voltage (Vdata) to the light emitting diode 300. For example, the display driver circuitry 220 may provide the current 320 to the light emitting diode 300 for displaying the second image on the display panel 240, by providing the light emitting signal 315 to each of the gate electrode of the fifth transistor 305 and the gate electrode of the sixth transistor 306, as in a state 351. As a non-limiting example, the light emitting signal 315 may be provided to each of the gate electrode of the fifth transistor 305 and the gate electrode of the sixth transistor 306 two or more times within a time interval 391. For example, the time interval 391 may be a light emitting section of each of the plurality of sub-pixels. For example, the time interval 391 may be a time interval of a vertical synchronization signal for the display driver circuitry 220 used to display the second image. However, it is not limited thereto.

For example, the display driver circuitry 220 may execute, within the time interval 391, multiple transmissions of the light emitting signal 315 from the display driver circuitry 220 to each of the gate electrode of the fifth transistor 305 and the gate electrode of the sixth transistor 306. For example, the multiple transmissions may include a first transmission that transmits the light emitting signal 315 from the display driver circuitry 220 to each of the gate electrode of the fifth transistor 305 and the gate electrode of the sixth transistor 306 and a second transmission that transmits the light emitting signal 315 again from the display driver circuitry 220 to each of the gate electrode of the fifth transistor 305 and the gate electrode of the sixth transistor 306 after the termination of the first transmission. As a non-limiting example, the display driver circuitry 220 may refrain from executing the single adjustment 332 between the first transmission and the second transmission. For example, the single adjustment 332 may not be executed between the first transmission and the second transmission. For another example, providing the third signal 313 from among providing the first signal 311 and providing the third signal 313 may be executed between the first transmission and the second transmission.

As a non-limiting example, the display driver circuitry 220 may execute, before the light emitting diode 300 is emitted within the address scan after the execution of the single adjustment 332, an adjustment of the threshold voltage of the first transistor 301 for applying a bias voltage (Vbias) to the source electrode of the first transistor 301 within the address scan, as in a state 381. For example, the adjustment as in the state 381 may be executed after applying a data voltage (Vdata) to the gate electrode of the first transistor 301. For example, the adjustment as in the state 381 may be executed while the gate electrode of the first transistor 301 has a data voltage (Vdata). For example, the adjustment as in the state 381 may be executed by providing the third signal 313 to the gate electrode of the eighth transistor 308. For example, since the third signal 313 is provided to the gate electrode of the seventh transistor 307 as well as the gate electrode of the eighth transistor 308, the anode of the light emitting diode 300 may be initialized based on a second initialization voltage (Vint2).

As a non-limiting example, a length of time for applying a bias voltage (Vbias) to the source electrode of the first transistor 301 before the light emitting diode 300 is emitted may be different from a length of time for applying a bias voltage (Vbias) to the source electrode of the first transistor 301 within the single adjustment. As a non-limiting example, time providing the third signal 313 as in the state 381 may be longer than time providing the third signal 313 as in the state 334. For example, time for applying a bias voltage to the source electrode of the first transistor 301 within the single adjustment 332 (e.g., the state 334) may be shorter than time for applying a bias voltage (Vbias) to the source electrode of the first transistor 301 outside the single adjustment 332 (e.g., the state 381) (or applying a bias voltage (Vbias) to the source electrode of the first transistor 301 after applying the data voltage (Vdata)). For example, since applying a bias voltage (Vbias) to the source electrode of the first transistor 301 outside the single adjustment 332 is executed after applying the data voltage (Vdata) and before the light emitting diode 300 is emitted, applying the bias voltage (Vbias) to the source electrode of the first transistor 301 outside the single adjustment 332 may be longer than time for applying the bias voltage (Vbias) to the source electrode of the first transistor 301 within the single adjustment 332.

Referring back to FIG. 3A, the display driver circuitry 220 may display the image based on the address scan including the multiple adjustments. Displaying the image based on the address scan including the multiple adjustments may be exemplified in the description of FIG. 4.

Figure 4:
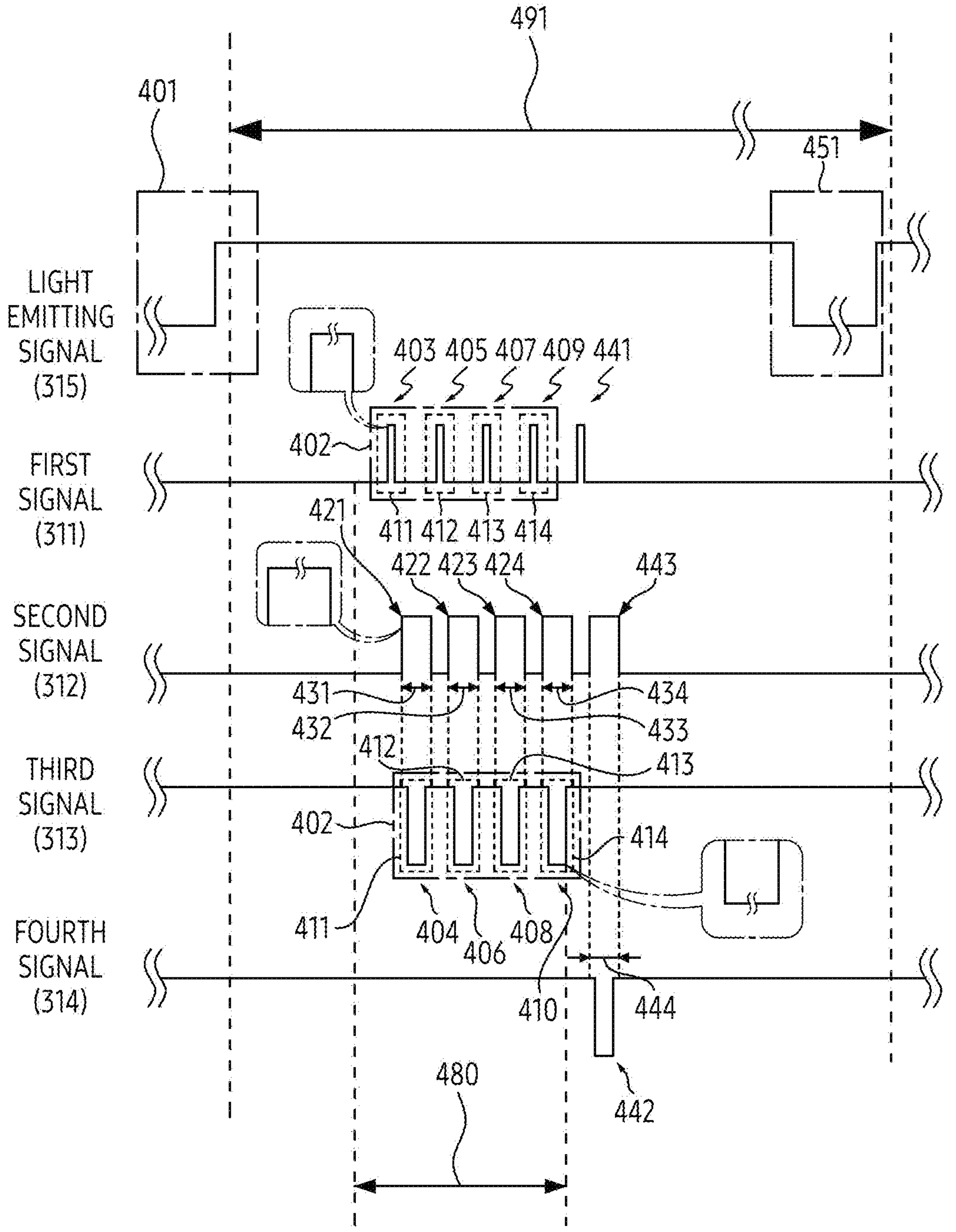
FIG. 4 illustrates an example of multiple adjustments of a threshold voltage of a driving transistor that are executed before applying a data voltage to a gate electrode of the driving transistor according to an embodiment of the disclosure.

FIG. 4 illustrates an example of multiple adjustments of a threshold voltage of a driving transistor that are executed before applying a data voltage to a gate electrode of the driving transistor according to an embodiment of the disclosure.

Referring to FIG. 4, the display driver circuitry 220 may display a first image on the display panel 240 by providing a light emitting signal 315 to each of the gate electrode of the fifth transistor 305 and the gate electrode of the sixth transistor 306, as in a state 401.

For example, the display driver circuitry 220 may execute multiple adjustments 402 of the threshold voltage of the first transistor 301 before the light emitting diode 300 is emitted for displaying of a second image subsequent to the first image.

For example, each of the multiple adjustments 402 may include initializing the gate electrode of the first transistor 301 and applying a bias voltage (Vbias) to the source electrode of the first transistor 301 in which the gate electrode is initialized. For example, the bias voltage (Vbias) is a voltage set (or determined) for adjusting the threshold voltage of the first transistor 301 and may be about 6 (V). However, it is not limited thereto.

For example, the multiple adjustments 402 may include a first adjustment 411 of the threshold voltage of the first transistor 301. For example, the first adjustment 411 may include initializing the gate electrode of the first transistor 301 having a data voltage used for the displaying of the first image by providing a first signal 311 to the gate electrode of the fourth transistor 304 as in a state 403, and applying a bias voltage (Vbias) to the source electrode of the first transistor 301, in which the gate electrode is initialized, by providing a third signal 313 to the gate electrode of the eighth transistor 308 as in a state 404. For example, applying a bias voltage (Vbias) by providing the third signal 313 within the first adjustment 411 may be executed while the gate electrode of the first transistor 301 is connected to the drain electrode of the first transistor 301 through the third transistor 303 by providing a second signal 312 to the gate electrode of the third transistor 303 as in a state 421. For example, applying a bias voltage (Vbias) to the source electrode of the first transistor 301 within the first adjustment 411 may be executed within a first section 431, which provides the second signal 312 as in the state 421 so that a current from the source electrode of the first transistor 301 to the drain electrode of the first transistor 301 flows to the capacitor 309 through the third transistor 303. For example, applying a bias voltage (Vbias) to the source electrode of the first transistor 301 within the first adjustment 411 may be executed within the first section 431 to enhance the adjustment of the threshold voltage of the first transistor 301. Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the first adjustment 411. For example, the initialization of the anode may be implemented to enhance the expression of black (or black color) using the light emitting diode 300.

For example, the multiple adjustments 402 may include a second adjustment 412 of the threshold voltage of the first transistor 301. For example, the second adjustment 412 may include initializing the gate electrode of the first transistor 301 having a voltage according to the bias voltage (Vbias) applied within the first adjustment 411 (e.g., a voltage reduced by the threshold voltage from the bias voltage (Vbias)) by providing the first signal 311 to the gate electrode of the fourth transistor 304 as in a state 405, and applying the bias voltage (Vbias) to the source electrode of the first transistor 301, in which the gate electrode is initialized, by providing the third signal 313 to the gate electrode of the eighth transistor 308 as in a state 406. For example, applying the bias voltage (Vbias) by providing the third signal 313 within the second adjustment 412 may be executed while the gate electrode of the first transistor 301 is connected to the drain electrode of the first transistor 301 through the third transistor 303 by providing the second signal 312 to the gate electrode of the third transistor 303 as in a state 422. For example, applying the bias voltage (Vbias) to the source electrode of the first transistor 301 within the second adjustment 412 may be executed within a second section 432 that provides the second signal 312 as in the state 422 so that a current from the source electrode of the first transistor 301 to the drain electrode of the first transistor 301 flows to the capacitor 309 through the third transistor 303. For example, applying the bias voltage (Vbias) to the source electrode of the first transistor 301 within the second adjustment 412 may be executed within the second section 432 to enhance the adjustment of the threshold voltage of the first transistor 301. Since the third signal 313 is provided to the gate electrode of the seventh transistor 307 as well as the gate electrode of the eighth transistor 308, the anode of the light emitting diode 300 may be initialized based on the second initialization voltage (Vint2) while the bias voltage (Vbias) is applied to the source electrode of the first transistor 301 within the second adjustment 412. For example, the initialization of the anode may be implemented to enhance the expression of black (or black color) using the light emitting diode 300.

For example, the multiple adjustments 402 may include a third adjustment 413 of the threshold voltage of the first transistor 301. For example, the third adjustment 413 may include initializing the gate electrode of the first transistor 301 having a voltage according to the bias voltage applied within the second adjustment 412 (e.g., a voltage reduced by the threshold voltage from the bias voltage (Vbias)) by providing the first signal 311 to the gate electrode of the fourth transistor 304 as in a state 407, and applying the bias voltage (Vbias) to the source electrode of the first transistor 301, in which the gate electrode is initialized, by providing the third signal 313 to the gate electrode of the eighth transistor 308 as in a state 408. For example, applying the bias voltage (Vbias) by providing the third signal 313 within the third adjustment 413 may be executed while the gate electrode of the first transistor 301 is connected to the drain electrode of the first transistor 301 through the third transistor 303 by providing the second signal 312 to the gate electrode of the third transistor 303 as in a state 423. For example, applying the bias voltage (Vbias) to the source electrode of the first transistor 301 within the third adjustment 413 may be executed within the third section 433 that provides the second signal 312 as in the state 423 so that a current from the source electrode of the first transistor 301 to the drain electrode of the first transistor 301 flows to the capacitor 309 through the third transistor 303. For example, applying the bias voltage (Vbias) to the source electrode of the first transistor 301 within the third adjustment 413 may be executed within the third section 433 to enhance the adjustment of the threshold voltage of the first transistor 301. Since the third signal 313 is provided to the gate electrode of the seventh transistor 307 as well as the gate electrode of the eighth transistor 308, the anode of the light emitting diode 300 may be initialized based on the second initialization voltage (Vint2) while the bias voltage (Vbias) is applied to the source electrode of the first transistor 301 within the third adjustment 413. For example, the initialization of the anode may be implemented to enhance the expression of black (or black color) using the light emitting diode 300.

For example, the multiple adjustments 402 may include a fourth adjustment 414 of the threshold voltage of the first transistor 301. For example, the fourth adjustment 414 may include initializing the gate electrode of the first transistor 301 having a voltage according to the bias voltage applied within the third adjustment 413 (e.g., a voltage reduced by the threshold voltage from the bias voltage (Vbias)) by providing the first signal 311 to the gate electrode of the fourth transistor 304 as in a state 409, and applying the bias voltage (Vbias) to the source electrode of the first transistor 301, in which the gate electrode is initialized, by providing the third signal 313 to the gate electrode of the eighth transistor 308 as in a state 410. For example, applying the bias voltage (Vbias) by providing the third signal 313 within the fourth adjustment 414 may be executed while the gate electrode of the first transistor 301 is connected to the drain electrode of the first transistor 301 through the third transistor 303 by providing the second signal 312 to the gate electrode of the third transistor 303 as in a state 424. For example, applying the bias voltage (Vbias) to the source electrode of the first transistor 301 within the fourth adjustment 414 may be executed within a fourth section 434 that provides the second signal 312 as in the state 424 so that a current from the source electrode of the first transistor 301 to the drain electrode of the first transistor 301 flows to the capacitor 309 through the third transistor 303. For example, applying the bias voltage (Vbias) to the source electrode of the first transistor 301 within the third adjustment 413 may be executed within the third section 433 to enhance the adjustment of the threshold voltage of the first transistor 301. Since the third signal 313 is provided to the gate electrode of the seventh transistor 307 as well as the gate electrode of the eighth transistor 308, the anode of the light emitting diode 300 may be initialized based on the second initialization voltage (Vint2) while the bias voltage (Vbias) is applied to the source electrode of the first transistor 301 within the fourth adjustment 414. For example, the initialization of the anode may be implemented to enhance the expression of black (or black color) using the light emitting diode 300.

For example, executing the multiple adjustments 402 during a time interval 480 may reduce occurrence of the afterimage rather than executing a single adjustment of the threshold voltage of the first transistor 301 during the time interval 480. For example, since the amount of a first current flowing from the source electrode of the first transistor 301 to the drain electrode of the first transistor 301 according to the multiple adjustments 402 executed during the time interval 480 is greater than the amount of a second current flowing from the source electrode of the first transistor 301 to the drain electrode of the first transistor 301 according to the single adjustment executed during the time interval 480, the multiple adjustments 402 executed during the time interval 480 may be more efficient than the single adjustment executed during the time interval 480. A difference between the amount of the first current and the amount of the second current may be exemplified in the description of FIG. 5.

Figure 5:
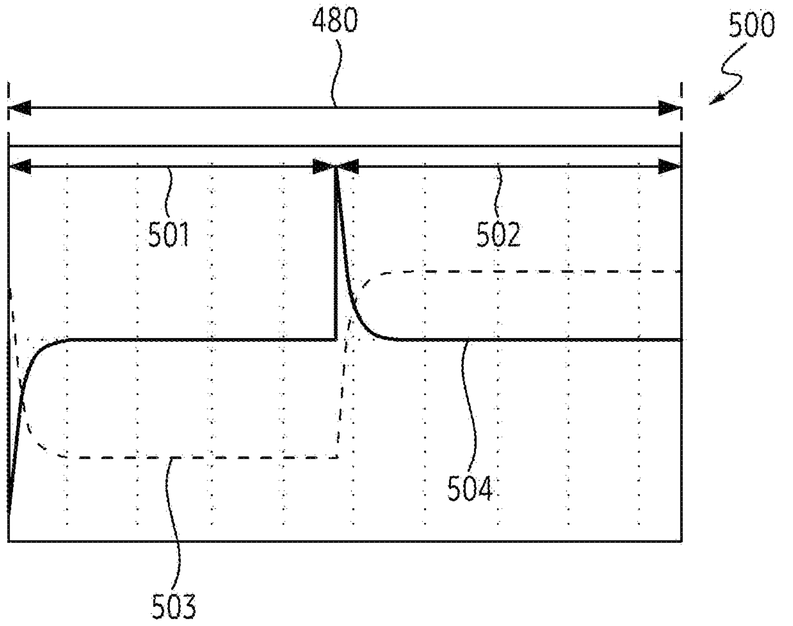
FIG. 5 is a chart illustrating a voltage and a current changed according to multiple adjustments according to an embodiment of the disclosure.
Figure 5:
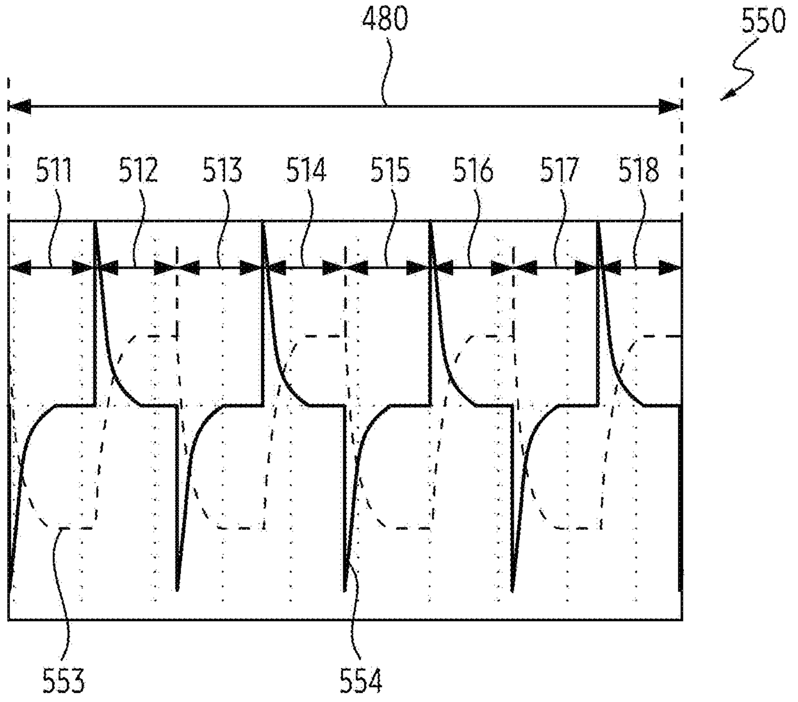

FIG. 5 is a chart illustrating a voltage and a current changed according to multiple adjustments according to an embodiment of the disclosure.

Referring to FIG. 5, a chart 500 illustrates a change in the second current according to the single adjustment executed during the time interval 480, and a chart 550 illustrates a change in the first current according to multiple adjustments (e.g., the multiple adjustments 402 in FIG. 4) executed during the time interval 480. A horizontal axis of each of the chart 500 and the chart 550 indicates time, and a vertical axis of each of the chart 500 and the chart 550 indicates a voltage and a current.

The time interval 480 in the chart 500 may include a time interval 501 initializing the gate electrode of the first transistor 301 and a time interval 502 applying a bias voltage (Vbias) to the source electrode of the first transistor 301 in which the gate electrode is initialized. A line 503 in the chart 500 indicates a change in a voltage of the gate electrode of the first transistor 301 that is changed according to the single adjustment. A line 504 in the chart 500 indicates a change in the second current that is changed according to the single adjustment. The line 504 may be opposite to the line 503.

The time interval 480 in the chart 550 may include a time interval 511 initializing the gate electrode of the first transistor 301 in the first adjustment 411, a time interval 512 applying a bias voltage (Vbias) to the source electrode of the first transistor 301 in which the gate electrode is initialized in the first adjustment 411, a time interval 513 initializing the gate electrode of the first transistor 301 in the second adjustment 412, a time interval 514 applying a bias voltage (Vbias) to the source electrode of the first transistor 301 in which the gate electrode is initialized in the second adjustment 412, a time interval 515 initializing the gate electrode of the first transistor 301 in the third adjustment 413, a time interval 516 applying a bias voltage (Vbias) to the source electrode of the first transistor 301 in which the gate electrode is initialized in the third adjustment 413, a time interval 517 initializing the gate electrode of the first transistor 301 in the fourth adjustment 414, and a time interval 518 applying a bias voltage (Vbias) to the source electrode of the first transistor 301 in which the gate electrode is initialized in the fourth adjustment 414. A line 553 in the chart 550 indicates a change in a voltage of the gate electrode of the first transistor 301 that is changed according to the multiple adjustments 402 (e.g., the first adjustment 411 to the fourth adjustment 414). A line 554 in the chart 550 indicates a change in the first current that is changed according to the multiple adjustments 402. The line 554 may be opposite to the line 553.

As indicated by the line 504 and the line 554, since the first current according to the multiple adjustments 402 changes more frequently than the second current according to the single adjustment, the amount of the first current may be greater than the amount of the second current. Since the amount of the first current is greater than the amount of the second current, a state of the threshold voltage of the first transistor 301 adjusted according to the multiple adjustments 402 may be more stable (or better) than a state of the threshold voltage of the first transistor 301 adjusted according to the single adjustment. Since the state of the threshold voltage of the first transistor 301 adjusted according to the multiple adjustments 402 is more stable than the state of the threshold voltage of the first transistor 301 adjusted according to the single adjustment, a quality of light emitted from the light emitting diode 300 based on the multiple adjustments 402 may be higher than a quality of light emitted from the light emitting diode 300 based on the single adjustment. A difference between the quality of light emitted from the light emitting diode 300 based on the multiple adjustments 402 and the quality of light emitted from the light emitting diode 300 based on the single adjustment may be exemplified in the description of FIG. 6.

Figure 6:
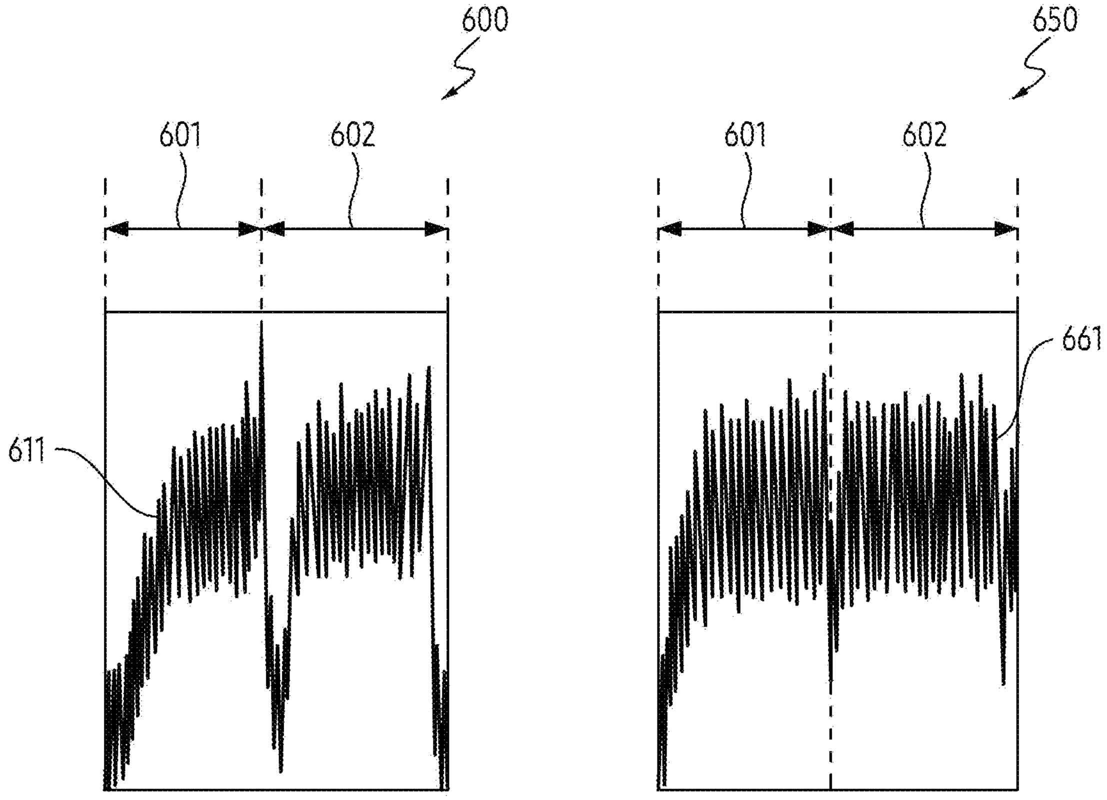
FIG. 6 is a chart illustrating luminance provided from a light emitting diode emitted after executing multiple adjustments according to an embodiment of the disclosure.

FIG. 6 is a chart illustrating luminance provided from a light emitting diode emitted after executing multiple adjustments according to an embodiment of the disclosure.

Referring to FIG. 6, a chart 600 illustrates a quality of light emitted from the light emitting diode 300 after executing the single adjustment, and a chart 650 illustrates a quality of light emitted from the light emitting diode 300 after executing the multiple adjustments 402. A horizontal axis of each of the chart 600 and the chart 650 indicates time, and a vertical axis of each of the chart 600 and the chart 650 indicates luminance (or brightness level). A line 611 in the chart 600 indicates a change in a first luminance provided within a time interval 601 from the light emitting diode 300 emitted based on the single adjustment, and a line 661 in the chart 650 indicates a change in a second luminance provided within the time interval 601 from the light emitting diode 300 emitted based on multiple adjustments (e.g., the multiple adjustments 402 in FIG. 4).

For example, the light emitting diode 300 may be emitted during the time interval 601 according to the single adjustment executed during the time interval 480. For example, the light emitting diode 300 may be emitted during the time interval 601 according to the multiple adjustments 402 executed during the time interval 480. As indicated by the line 611 within the time interval 601 in the chart 600 and the line 661 within the time interval 601 in the chart 650, the change in the second luminance provided from the light emitting diode 300 emitted according to the multiple adjustments 402 is more stable than the change in the first luminance provided from the light emitting diode 300 emitted according to the single adjustment. Since the change in the second luminance is more stable than the change in the first luminance, a quality of light emitted from the light emitting diode 300 based on the multiple adjustments 402 may be higher than a quality of light emitted from the light emitting diode 300 based on the single adjustment.

Referring back to FIG. 4, the multiple adjustments 402 that includes four adjustments (e.g., the first adjustment 411 to the fourth adjustment 414) illustrated in FIG. 4 are merely exemplary. The number of the multiple adjustments 402 may be greater than or equal to 2. For example, unlike the illustration of FIG. 4, the multiple adjustments 402 may include only the first adjustment 411 and the second adjustment 412. For example, unlike the illustration of FIG. 4, the multiple adjustments 402 may include only the first adjustment 411, the second adjustment 412, and the third adjustment 413. For example, unlike the illustration of FIG. 4, the number of the multiple adjustments 402 may be greater than or equal to 5.

For example, the display driver circuitry 220 may initialize the gate electrode of the first transistor 301 having a voltage according to the bias voltage (Vbias) applied within the fourth adjustment 414 (e.g., a voltage reduced by the threshold voltage from the bias voltage (Vbias)) by providing the first signal 311 to the gate electrode of the fourth transistor 304 as in a state 441 after the multiple adjustments 402 are executed.

For example, the display driver circuitry 220 may apply a data voltage (Vdata) to the gate electrode of the first transistor 301 initialized after the multiple adjustments 402 are executed (e.g., the gate electrode of the first transistor 301 initialized by providing the first signal 311 as in the state 441), by providing the fourth signal 314 to each of the gate electrode of the first transistor 301 and the gate electrode of the second transistor 302 as in a state 442. For example, applying the data voltage (Vdata) by providing the fourth signal 314 may be executed while the gate electrode of the first transistor 301 is connected to the drain electrode of the first transistor 301 through the third transistor 303 by providing the second signal 312 to the gate electrode of the third transistor 303 as in a state 443. For example, applying the data voltage (Vdata) may be executed within a section 444 that provides the second signal 312 as in the state 443.

For example, the display driver circuitry 220 may cause the light emitting diode 300 to emit light for the displaying of the second image by providing a current (e.g., the current 320 of FIG. 3A) according to the data voltage (Vdata) to the light emitting diode 300. For example, the display driver circuitry 220 may provide the current 320 to the light emitting diode 300 for displaying the second image on the display panel 240, by providing the light emitting signal 315 to each of the gate electrode of the fifth transistor 305 and the gate electrode of the sixth transistor 306, as in a state 451. As a non-limiting example, although not explicitly illustrated in FIG. 4, the light emitting signal 315 may be provided to each of the gate electrode of the fifth transistor 305 and the gate electrode of the sixth transistor 306 two or more times within a time interval 491. For example, within the time interval 491, the display driver circuitry 220 may execute multiple transmissions of the light emitting signal 315 from the display driver circuitry 220 to each of the gate electrode of the fifth transistor 305 and the gate electrode of the sixth transistor 306. For example, the multiple transmissions may include a first transmission that transmits the light emitting signal 315 from the display driver circuitry 220 to each of the gate electrode of the fifth transistor 305 and the gate electrode of the sixth transistor 306 and a second transmission that transmits the light emitting signal 315 from the display driver circuitry 220 to each of the gate electrode of the fifth transistor 305 and the gate electrode of the sixth transistor 306 after the termination of the first transmission. As a non-limiting example, the display driver circuitry 220 may refrain from executing the multiple adjustments 402 between the first transmission and the second transmission. For example, the multiple adjustments 402 may not be executed between the first transmission and the second transmission. The multiple transmissions may be applied to operations exemplified in the descriptions of FIGS. 8 to 10. For example, the multiple transmissions may be executed for each of a state 851, a state 1051, and a state 1052, which will be illustrated below.

The operations exemplified in the description of FIG. 4 may be executed within the time interval 491. For example, the time interval 491 may be a light emitting period of each of the plurality of sub-pixels. For example, the time interval 491 may be a time interval of a vertical synchronization signal for the display driver circuitry 220 used to display the second image. However, it is not limited thereto.

As described above, the display driver circuitry 220 executes the operations exemplified in the description of FIG. 4 for all sub-pixels used to display the second image, a state of a threshold voltage of a driving transistor (e.g., the first transistor 301) in a first sub-pixel from among the sub-pixels before the data voltage (Vdata) is provided for the displaying of the second image may correspond to a state of a threshold voltage of a driving transistor (e.g., the first transistor 301) in a second sub-pixel from among the sub-pixels adjacent to the first sub-pixel before the data voltage (Vdata) is provided for the displaying of the second image. For example, the electronic device 200 may reduce occurrence of the afterimage on the display panel 240 due to shifting of the threshold voltage of a driving transistor (e.g., the first transistor 301). Reducing the afterimage may be exemplified in the description of FIG. 7.

Figure 7:
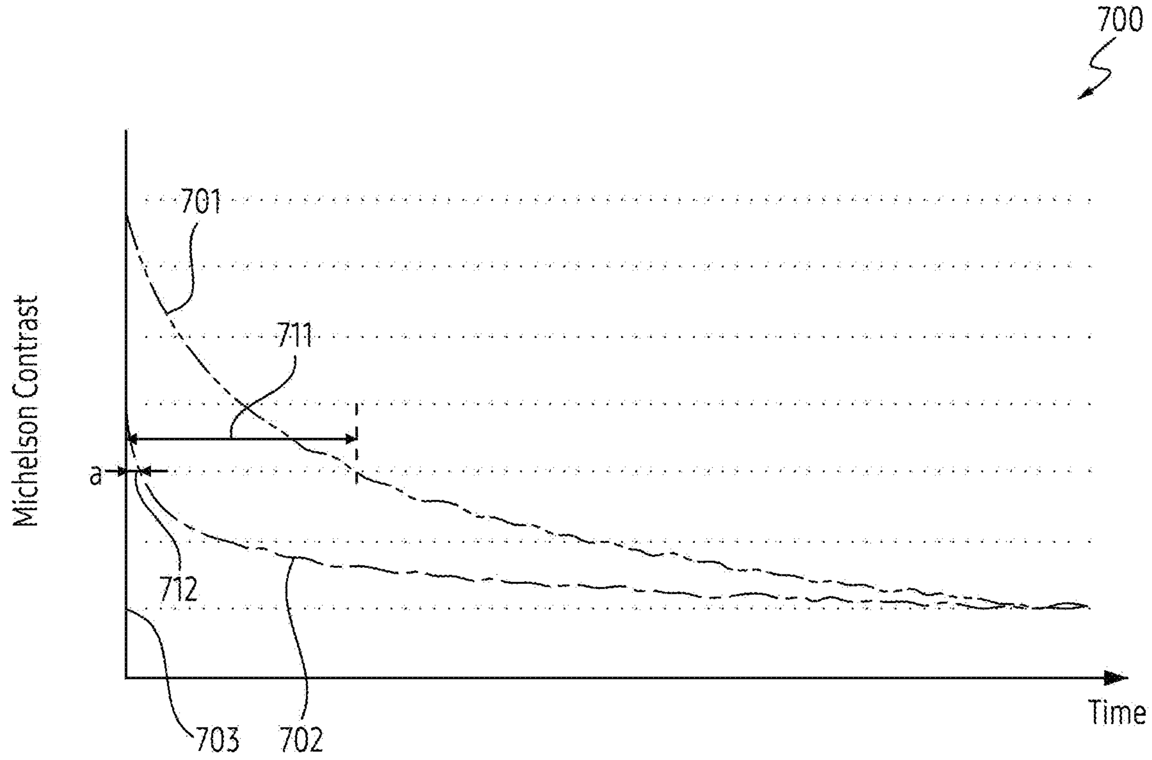
FIG. 7 is a chart illustrating an afterimage that is reduced according to execution of multiple adjustments according to an embodiment of the disclosure.

FIG. 7 is a chart illustrating an afterimage that is reduced according to execution of multiple adjustments according to an embodiment of the disclosure.

Referring to FIG. 7, a chart 700 indicates Michelson contrast of an image that changes over time. A horizontal axis of the chart 700 indicates time, and a vertical axis of the chart 700 indicates Michelson contrast.

A line 701 in the chart 700 indicates a change in Michelson contrast when displaying, on the display panel 240, a second image having only a gray level color predetermined based on the single adjustment exemplified in the description of FIGS. 4 to 6, after maintaining the first image on the display panel 240 for 30 minutes. A line 702 in the chart 700 indicates a change in Michelson contrast when displaying the second image on the display panel 240 based on the multiple adjustments 402, after maintaining the first image on the display panel 240 for 30 minutes. As a non-limiting example, the Michelson contrast may be calculated using Equation 1 below.

$$MC = (Lmax - Lmin)/(Lmax + Lmin) \qquad \text{Equation 1}$$

In Equation 1, MC indicates Michelson contrast, Lmin indicates a minimum luminance provided from the display panel 240 displaying the second image, and Lmax indicates a maximum luminance provided from the display panel 240 displaying the second image.

For example, since Michelson contrast of the line 701 at a start timing 703 is higher than Michelson contrast of the line 702 at the start timing 703, the electronic device 200 may reduce the occurrence of the afterimage on the display panel 240, by executing the multiple adjustments 402 for displaying an image.

For example, since time 712 elapsed until the Michelson contrast reached a within the line 702 is significantly shorter than time 711 elapsed until Michelson contrast reached a within the line 701, the electronic device 200 may reduce the occurrence of the afterimage on the display panel 240 by executing multiple adjustments 402 for displaying an image.

Referring back to FIG. 3A, the display driver circuitry 220 may display the image again based on the self-scan including the one or more adjustments, after displaying the image according to the address scan including the single adjustment or displaying the image according to the address scan including the multiple adjustments (e.g., the multiple adjustments 402 of FIG. 4). For example, the display driver circuitry 220 may execute multiple displays of the image, including a first display of the image according to the address scan including the single adjustment and a second display of the image according to the self-scan including the one or more adjustments. For example, the display driver circuitry 220 may execute multiple displays of the image, including a first display of the image according to the address scan including the multiple adjustments and a second display of the image according to the self-scan including the one or more adjustments. Displaying the image again based on the self-scan including the one or more adjustments may be exemplified in the description of FIG. 8.

Figure 8:
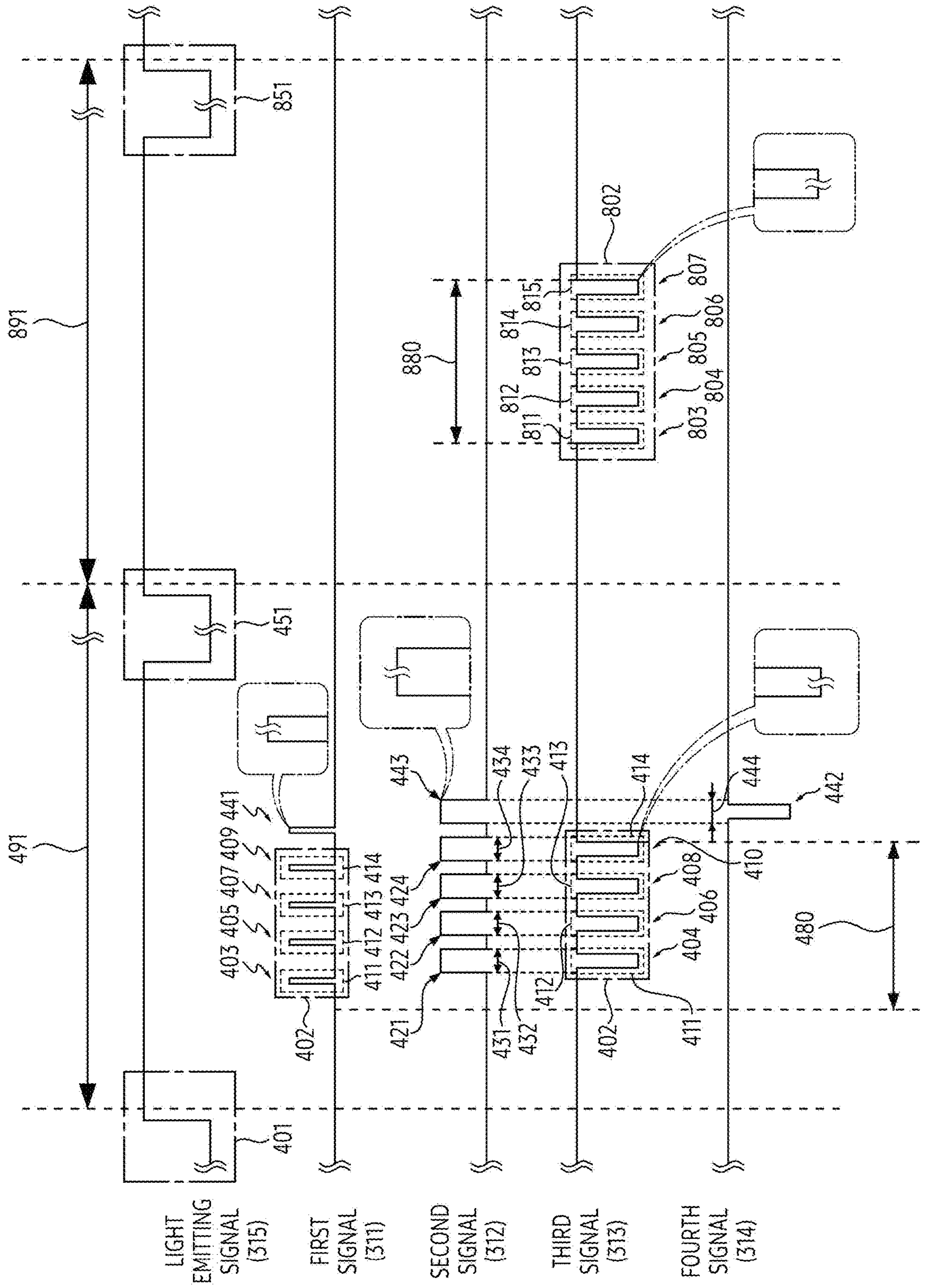
FIG. 8 illustrates an example of multiple adjustments and one or more adjustments of a threshold voltage of a driving transistor according to an embodiment of the disclosure.

FIG. 8 illustrates an example of multiple adjustments and one or more adjustments of a threshold voltage of a driving transistor according to an embodiment of the disclosure.

Referring to FIG. 8, the display driver circuitry 220 may display again the second image according to the self-scan including one or more adjustments 802 within a time interval 891 subsequent to the time interval 491, after displaying the second image on the display panel 240 by providing the light emitting signal 315 as in the state 451 within the time interval 491 (or display a first display of the second image). For example, the display driver circuitry 220 may execute a second display of the second image according to the self-scan including the one or more adjustments 802 within the time interval 891. For example, a length of time interval 891 may correspond to or be the same as a length of time interval 491. For example, the time interval 891 may be a light emitting period of each of the plurality of sub-pixels. For example, when each of the time interval 491 and the time interval 891 are the light-emitting period, the time interval 491 and the time interval 891 may be included in the time interval of the vertical synchronization signal for the display driver circuitry 220 used to display the second image. For example, the time interval 891 may be the time interval of the vertical synchronization signal for the display driver circuitry 220 used to display the second image. However, it is not limited thereto.

For example, each of the one or more adjustments 802 may include applying a bias voltage to the source electrode of the first transistor 301 from among initializing the gate electrode of the first transistor 301 and applying a bias voltage to the source electrode of the first transistor 301. For example, since each of the one or more adjustments 802 is included within the self-scan, each of the one or more adjustments 802 may not include initializing the gate electrode of the first transistor 301 to maintain a data voltage (Vdata).

For example, the one or more adjustments 802 may include a first adjustment 811 of the threshold voltage of the first transistor 301. For example, the first adjustment 811 may include applying a bias voltage (Vbias) to the source electrode of the first transistor 301 by providing a third signal 313 to the gate electrode of the eighth transistor 308 as in a state 803 while the gate electrode of the first transistor 301 has a data voltage (Vdata). Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the first adjustment 811.

For example, the one or more adjustments 802 may include a second adjustment 812 of the threshold voltage of the first transistor 301. For example, the second adjustment 812 may include applying a bias voltage (Vbias) to the source electrode of the first transistor 301 by providing a third signal 313 to the gate electrode of the eighth transistor 308 as in a state 804 while the gate electrode of the first transistor 301 has a data voltage (Vdata). Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the second adjustment 812.

For example, the one or more adjustments 802 may include a third adjustment 813 of the threshold voltage of the first transistor 301. For example, the third adjustment 813 may include applying a bias voltage (Vbias) to the source electrode of the first transistor 301 by providing a third signal 313 to the gate electrode of the eighth transistor 308 as in a state 805 while the gate electrode of the first transistor 301 has a data voltage (Vdata). Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the third adjustment 813.

For example, the one or more adjustments 802 may include a fourth adjustment 814 of the threshold voltage of the first transistor 301. For example, the fourth adjustment 814 may include applying a bias voltage (Vbias) to the source electrode of the first transistor 301 by providing a third signal 313 to the gate electrode of the eighth transistor 308 as in a state 806 while the gate electrode of the first transistor 301 has a data voltage (Vdata). Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the fourth adjustment 814.

For example, the one or more adjustments 802 may include a fifth adjustment 815 of the threshold voltage of the first transistor 301. For example, the fifth adjustment 815 may include applying a bias voltage (Vbias) to the source electrode of the first transistor 301 by providing a third signal 313 to the gate electrode of the eighth transistor 308 as in a state 807 while the gate electrode of the first transistor 301 has a data voltage (Vdata). Since the third signal 313 is provided to the gate electrode of the seventh transistor 307 as well as the gate electrode of the eighth transistor 308, the anode of the light emitting diode 300 may be initialized based on a second initialization voltage (Vint2) while the bias voltage (Vbias) is applied to the source electrode of the first transistor 301 within the fifth adjustment 815.

As a non-limiting example, executing two or more adjustments (e.g., the one or more adjustments 802 illustrated in FIG. 8) during a time interval 880 within the above self-scan may reduce occurrence of the afterimage rather than executing a single adjustment of the threshold voltage of the first transistor 301 during the time interval 880. For example, a quality of light emitted from the light emitting diode 300 based on the two or more adjustments during the time interval 880 may be higher than a quality of light emitted from the light emitting diode 300 based on the single adjustment. A difference between the quality of light emitted from the light emitting diode 300 based on the two or more adjustments and the quality of light emitted from the light emitting diode 300 based on the single adjustment may be exemplified in the description of FIG. 6.

Referring to FIG. 6, the light emitting diode 300 may be emitted during the time interval 602 in the chart 600 according to the single adjustment executed during the time interval 880 within the self-scan. For example, the light emitting diode 300 may be emitted during the time interval 602 in the chart 650 according to the one or more adjustments 802 executed during the time interval 880 within the self-scan. As indicated by the line 611 within the time interval 602 in the chart 600 and the line 661 within the time interval 602 in the chart 650, a change in a second luminance provided from the light emitting diode 300 emitted according to the one or more adjustments 802 is more stable than a change in a first luminance provided from the light emitting diode 300 emitted according to the single adjustment. Since the change in the second luminance is more stable than the change in the first luminance, a quality of light emitted from the light emitting diode 300 based on the one or more adjustments 802 may be higher than a quality of light emitted from the light emitting diode 300 based on the single adjustment.

For example, a difference between a change in light from the light emitting diode 300 indicated by the line 661 within the time interval 601 and a change in light from the light emitting diode 300 indicated by the line 661 within the time interval 602 is less than a difference between a change in light from the light emitting diode 300 indicated by the line 611 within the time interval 601 and a change in light from the light emitting diode 300 indicated by the line 611 within the time interval 602. For example, the address scan according to the multiple adjustments 402 and the self-scan according to the one or more adjustments 802 may display an image having a higher quality than the address scan according to the single adjustment and the self-scan according to the single adjustment.

Referring back to FIG. 8, as a non-limiting example, the one or more adjustments 802 may be replaced with a single adjustment. For example, the display driver circuitry 220 may execute, in the self-scan, the single adjustment in which applying of the bias voltage (Vbias) to the source electrode of the first transistor 301 is maintained during the time interval 880, by maintaining providing the third signal 313 during the time interval 880.

For example, the display driver circuitry 220 may provide a current 320 to the light emitting diode 300 to display again the second image on the display panel 240, by providing the light emitting signal 315 to each of the gate electrode of the fifth transistor 305 and the gate electrode of the sixth transistor 306 as in a state 851, after the one or more adjustments 802 (or the single adjustment) is executed.

As a non-limiting example, the display driver circuitry 220 may apply a bias voltage (Vbias) to the source electrode of the first transistor 301 before the multiple adjustments 402 are executed within the address scan. As a non-limiting example, the display driver circuitry 220 may apply a bias voltage (Vbias) to the source electrode of the first transistor 301 before the light emitting diode 300 is emitted in the address scan after the execution of the multiple adjustments 402. As a non-limiting example, the display driver circuitry 220 may apply a bias voltage (Vbias) to the source electrode of the first transistor 301 before the one or more adjustments 802 are executed within the self-scan. As a non-limiting example, the display driver circuitry 220 may apply a bias voltage (Vbias) to the source electrode of the first transistor 301 before the light emitting diode 300 is emitted in the self-scan after the execution of the one or more adjustments 802. These operations may be exemplified in the description of FIG. 9.

Figure 9:
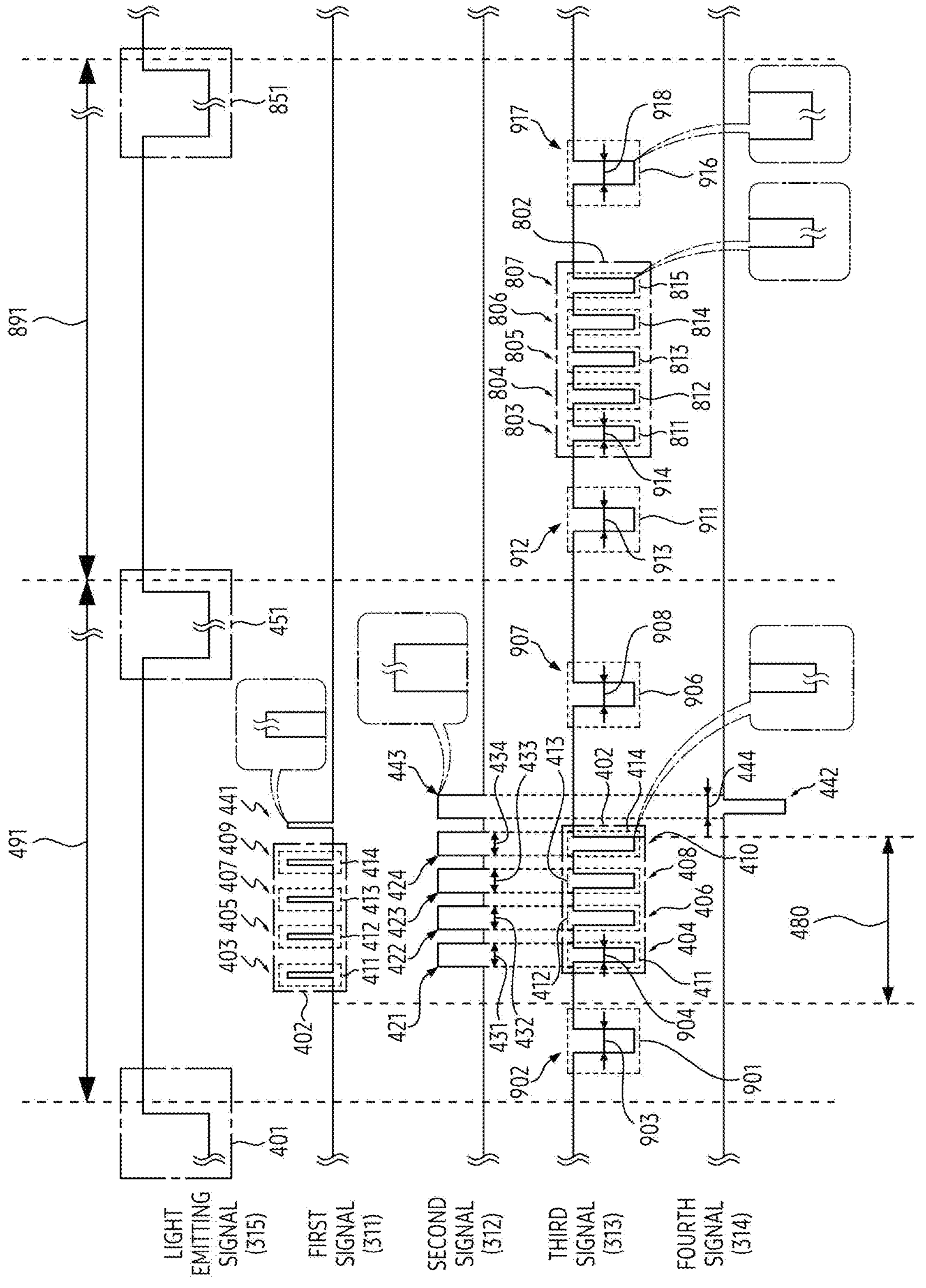
FIG. 9 illustrates an example of applying a bias voltage to a source electrode of a driving transistor before multiple adjustments are executed, and applying a bias voltage to the source electrode of the driving transistor after a data voltage is applied to a gate electrode of the driving transistor according to an embodiment of the disclosure.

FIG. 9 illustrates an example of applying a bias voltage to a source electrode of a driving transistor before multiple adjustments are executed, and applying a bias voltage to the source electrode of the driving transistor after a data voltage is applied to a gate electrode of the driving transistor according to an embodiment of the disclosure.

Referring to FIG. 9, the display driver circuitry 220 may execute, in the address scan, an adjustment 901 of the threshold voltage of the first transistor 301 applying a bias voltage (Vbias) to the source electrode of the first transistor 301, before the multiple adjustments 402 are executed in the address scan. For example, the adjustment 901 may be executed before initializing the gate electrode of the first transistor 301 in the first adjustment 411. For example, the adjustment 901 may be executed after displaying the first image. For example, the adjustment 901 may be executed while the gate electrode of the first transistor 301 has a data voltage for displaying the first image. For example, the adjustment 901 may be executed by providing a third signal 313 to the gate electrode of the eighth transistor 308 as in a state 902. For example, since the third signal 313 is provided to the gate electrode of the seventh transistor 307 as well as the gate electrode of the eighth transistor 308, the anode of the light emitting diode 300 may be initialized based on the second initialization voltage (Vint2). As a non-limiting example, a length 903 of time executing the adjustment 901 may be different from a length 904 of time applying the bias voltage (Vbias) to the source electrode of the first transistor 301 in each of the multiple adjustments 402. For example, the length 903 may be longer than the length 904, as illustrated in FIG. 9. However, it is not limited thereto. For example, unlike the illustration of FIG. 9, the length 903 may be shorter than the length 904. As a non-limiting example, a relationship between the length 903 and the length 904 may vary according to a characteristic of the display panel 240. As a non-limiting example, the relationship between the length 903 and the length 904 may vary according to a characteristic of an image (e.g., the second image) to be displayed on the display panel 240.

For example, the display driver circuitry 220 may execute, in the address scan, an adjustment 906 of the threshold voltage of the first transistor 301 applying a bias voltage (Vbias) to the source electrode of the first transistor 301, before the light emitting diode 300 is emitted in the address scan after the execution of the multiple adjustments 402. For example, the adjustment 906 may be executed after applying the data voltage (Vdata) to the gate electrode of the first transistor 301. For example, the adjustment 906 may be executed while the gate electrode of the first transistor 301 has the data voltage (Vdata). For example, the adjustment 906 may be executed by providing a third signal 313 to the gate electrode of the eighth transistor 308 as in a state 907. For example, since the third signal 313 is provided to the gate electrode of the seventh transistor 307 as well as the gate electrode of the eighth transistor 308, the anode of the light emitting diode 300 may be initialized based on the second initialization voltage (Vint2). As a non-limiting example, a length 908 of time executing the adjustment 906 may be different from a length 904 of time applying the bias voltage (Vbias) to the source electrode of the first transistor 301 in each of the multiple adjustments 402. For example, the length 908 may be longer than the length 904, as illustrated in FIG. 9. However, it is not limited thereto. For example, unlike the illustration of FIG. 9, the length 908 may be shorter than the length 904. As a non-limiting example, a relationship between the length 908 and the length 904 may vary according to a characteristic of the display panel 240. As a non-limiting example, the relationship between the length 908 and the length 904 may vary according to a characteristic of an image (e.g., the second image) to be displayed on the display panel 240.

As a non-limiting example, the length 908 may be longer than length 903. As a non-limiting example, the length 908 may be shorter than the length 903. As a non-limiting example, the length 908 may be the same as the length 903.

For example, the display driver circuitry 220 may execute an adjustment 911 of the threshold voltage of the first transistor 301 applying the bias voltage (Vbias) to the source electrode of the first transistor 301 in the self-scan, before the one or more adjustments 802 are executed in the self-scan. For example, the adjustment 911 may be executed by providing the third signal 313 to the gate electrode of the eighth transistor 308, as in a state 912. For example, since the third signal 313 is provided to the gate electrode of the seventh transistor 307 as well as the gate electrode of the eighth transistor 308, the anode of the light emitting diode 300 may be initialized based on the second initialization voltage (Vint2). As a non-limiting example, a length of time (i.e., length 913) of executing the adjustment 911 may be different from a length of time (i.e., length 914) applying the bias voltage (Vbias) to the source electrode of the first transistor 301 within each of the one or more adjustments 802. For example, the length 913 may be longer than the length 914, as illustrated in FIG. 9. However, it is not limited thereto. For example, unlike the illustration of FIG. 9, the length 913 may be shorter than the length 914. As a non-limiting example, a relationship between the length 913 and the length 914 may vary according to a characteristic of the display panel 240. As a non-limiting example, the relationship between the length 913 and the length 914 may vary according to a characteristic of an image (e.g., the second image) to be displayed on the display panel 240.

For example, the display driver circuitry 220 may execute an adjustment 916 of the threshold voltage of the first transistor 301 applying the bias voltage (Vbias) to the source electrode of the first transistor 301 in the self-scan, before the light emitting diode 300 is emitted within the self-scan after the execution of the one or more adjustments 802. For example, the adjustment 916 may be executed by providing the third signal 313 to the gate electrode of the eighth transistor 308, as in a state 917. For example, since the third signal 313 is provided to the gate electrode of the seventh transistor 307 as well as the gate electrode of the eighth transistor 308, the anode of the light emitting diode 300 may be initialized based on the second initialization voltage (Vint2). As a non-limiting example, a length of time (i.e., length 918) of executing the adjustment 916 may be different from a length of time (i.e., length 914) applying the bias voltage (Vbias) to the source electrode of the first transistor 301 within each of the one or more adjustments 802. For example, the length 918 may be longer than the length 914, as illustrated in FIG. 9. However, it is not limited thereto. For example, unlike the illustration of FIG. 9, the length 918 may be shorter than the length 914. As a non-limiting example, a relationship between the length 918 and the length 914 may vary according to a characteristic of the display panel 240. As a non-limiting example, the relationship between the length 913 and the length 914 may vary according to a characteristic of an image (e.g., the second image) to be displayed on the display panel 240.

As a non-limiting example, the length 913 may be longer than the length 903. As a non-limiting example, the length 913 may be shorter than the length 903. As a non-limiting example, the length 913 may be the same as the length 903. As a non-limiting example, the length 913 may be longer than the length 908. As a non-limiting example, the length 913 may be shorter than the length 908. As a non-limiting example, the length 913 may be the same as the length 908. As a non-limiting example, the length 913 may be longer than the length 918. As a non-limiting example, the length 913 may be shorter than the length 918. As a non-limiting example, the length 913 may be the same as the length 918.

As a non-limiting example, the length 918 may be longer than the length 903. As a non-limiting example, the length 918 may be shorter than the length 903. As a non-limiting example, the length 918 may be the same as the length 903. As a non-limiting example, the length 918 may be longer than the length 908. As a non-limiting example, the length 918 may be shorter than the length 908. As a non-limiting example, the length 918 may be the same as the length 908.

For example, the display driver circuitry 220 may execute the multiple displays of the second image to maintain the second image on the display panel 240. For example, the first display according to the address scan among the multiple displays may be executed according to the address scan, and each of remaining display except for the first display among the multiple displays may be executed according to the self scan. As a non-limiting example, the length 913 of time executing the adjustment 911 within the self-scan for each of the remaining displays and/or the length 918 of time executing the adjustment 916 within the self-scan for each of the remaining displays may be changed according to a length of time maintaining the second image. As a non-limiting example, the length 913 of time executing the adjustment 911 within the self-scan for each of the remaining displays and/or the length 918 of time executing the adjustment 916 within the self-scan for each of the remaining displays may be changed according to the number of the remaining displays. The change in the length of time (i.e., length 913) executing the adjustment 911 within the self-scan for each of the remaining displays and/or the length 918 of time executing the adjustment 916 within the self-scan for each of the remaining displays may be exemplified in the description of FIG. 10.

Figure 10:
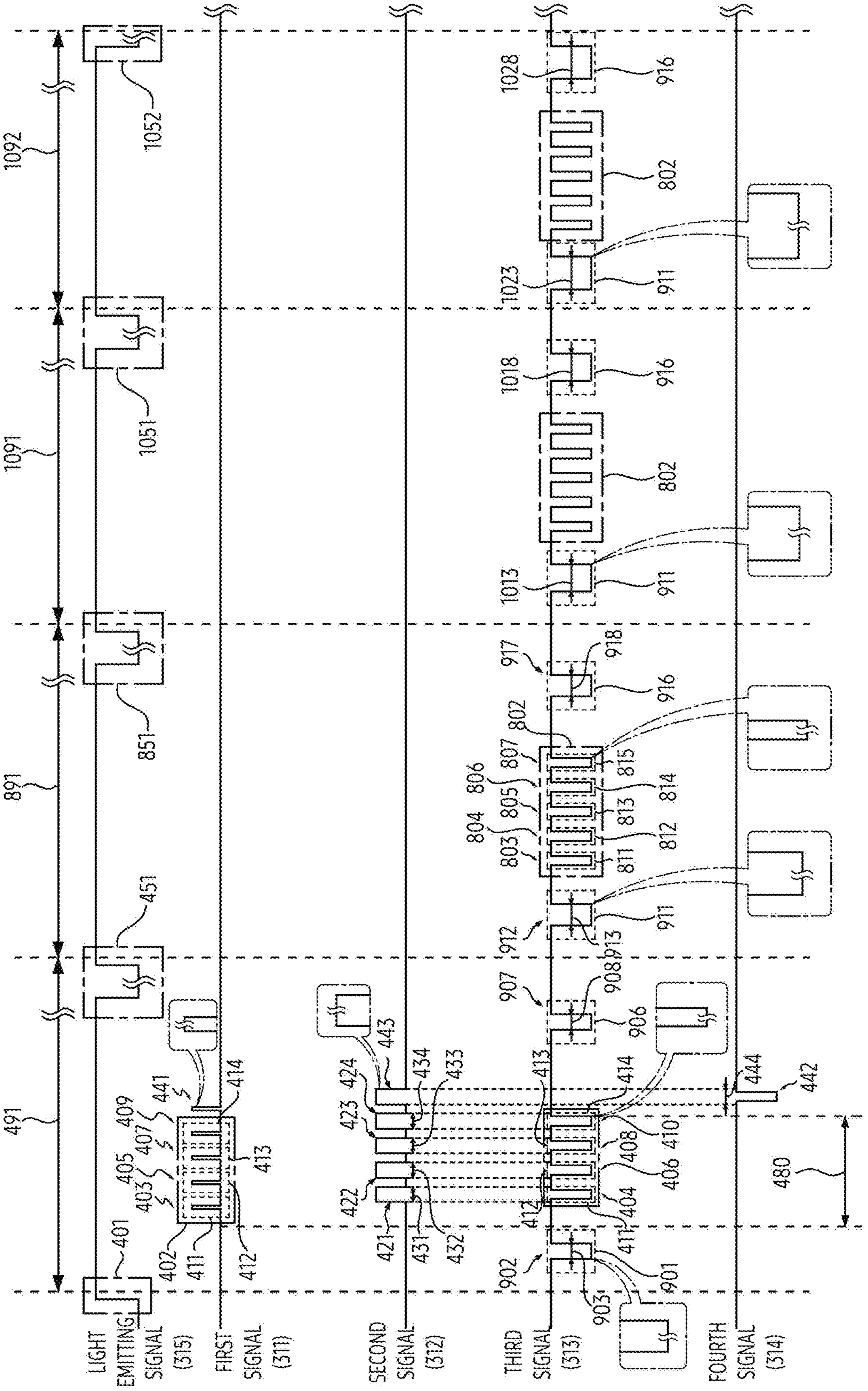
FIG. 10 illustrates an example of changing time for applying a bias voltage to a source electrode of a driving transistor before one or more adjustments are executed, and changing time for applying a bias voltage to the source electrode of the driving transistor after one or more adjustments are executed according to an embodiment of the disclosure.

FIG. 10 illustrates an example of changing time for applying a bias voltage to a source electrode of a driving transistor before one or more adjustments are executed, and changing time for applying a bias voltage to the source electrode of the driving transistor after one or more adjustments are executed according to an embodiment of the disclosure.

Referring to FIG. 10, the display driver circuitry 220 may execute a third display of the second image according to a self-scan including the adjustment 911, the one or more adjustments 802, and the adjustment 916 within a time interval 1091 subsequent to the time interval 891. For example, a length 1013 of time executing the adjustment 911 within the time interval 1091 may be different from a length 913 of time executing the adjustment 911 within the time interval 891. As a non-limiting example, the length 1013 may be longer than the length 913 as time for which the second image is maintained on the display panel 240 increases. For example, a length 1018 of time executing the adjustment 916 within the time interval 1091 may be different from a length 918 of time executing the adjustment 911 within the time interval 891. As a non-limiting example, the length 1018 may be longer than the length 918 as time for which the second image is maintained on the display panel 240 increases. For example, the display driver circuitry 220 may cause the light emitting diode 300 to emit light by providing the light emitting signal 315 to each of the gate electrode of the fifth transistor 305 and the gate electrode of the sixth transistor 306 as in a state 1051, after executing the adjustment 916 having the length 1018.

The display driver circuitry 220 may execute a fourth display of the second image according to a self-scan including the adjustment 911, the one or more adjustments 802, and the adjustment 916 within a time interval 1092 subsequent to the time interval 1091. For example, a length 1023 of time executing the adjustment 911 within the time interval 1092 may be different from a length 1013 of time executing the adjustment 911 within the time interval 1091. As a non-limiting example, the length 1023 may be longer than the length 1013 as time for which the second image is maintained on the display panel 240 increases. For example, a length 1028 of time executing the adjustment 916 within the time interval 1092 may be different from a length 1018 of time executing the adjustment 911 within the time interval 1091. As a non-limiting example, the length 1028 may be longer than the length 1018 as time for which the second image is maintained on the display panel 240 increases. For example, the display driver circuitry 220 may cause the light emitting diode 300 to emit light by providing the light emitting signal 315 to each of the gate electrode of the fifth transistor 305 and the gate electrode of the sixth transistor 306 as in a state 1052, after executing the adjustment 916 having the length 1028.

FIG. 10 illustrates the length 913 longer than the length 903, the length 1013 longer than the length 913, and the length 1023 longer than the length 1013 as the time for which the second image is maintained on the display panel 240 becomes longer, but it is merely exemplary. For example, according to a characteristic of the display panel 240 and/or a characteristic of an image displayed on the display panel 240, the length 913 may be shorter than the length 903, the length 1013 may be shorter than the length 913, and the length 1023 may be shorter than the length 1013.

FIG. 10 illustrates the length 918 longer than the length 908, the length 1018 longer than the length 918, and the length 1028 longer than the length 1018 as the time for which the second image is maintained on the display panel 240 becomes longer, but it is merely exemplary. For example, according to a characteristic of the display panel 240 and/or a characteristic of an image displayed on the display panel 240, the length 918 may be shorter than the length 908, the length 1018 may be shorter than the length 918, and the length 1028 may be shorter than the length 1018.

For example, since the third signal 313 provided to the gate electrode of the eighth transistor 308 for each of the execution of the adjustment 901, the execution of the adjustment 911 within the time interval 891, the execution of the adjustment 911 within the time interval 1091, and the execution of the adjustment 911 within the time interval 1092 is provided to the gate electrode of the seventh transistor 307, time executing the initialization of the anode of the light emitting diode 300 may be changed according to a change from the length 903 to the length 913, a change from the length 913 to the length 1013, and a change from the length 1013 to the length 1023.

For example, since the third signal 313 provided to the gate electrode of the eighth transistor 308 for each of the execution of the adjustment 906, the execution of the adjustment 916 within the time interval 891, the execution of the adjustment 916 within the time interval 1091, and the execution of the adjustment 916 within the time interval 1092 is provided to the gate electrode of the seventh transistor 307, time executing the initialization of the anode of the light emitting diode 300 may be changed according to a change from the length 908 to the length 918, a change from the length 918 to the length 1018, and a change from the length 1018 to the length 1028.

A luminance of light provided from the light emitting diode 300 may be changed according to a change in the time executing the initialization of the anode. The change in the luminance may be exemplified in the description of FIG. 11.

Figure 11:
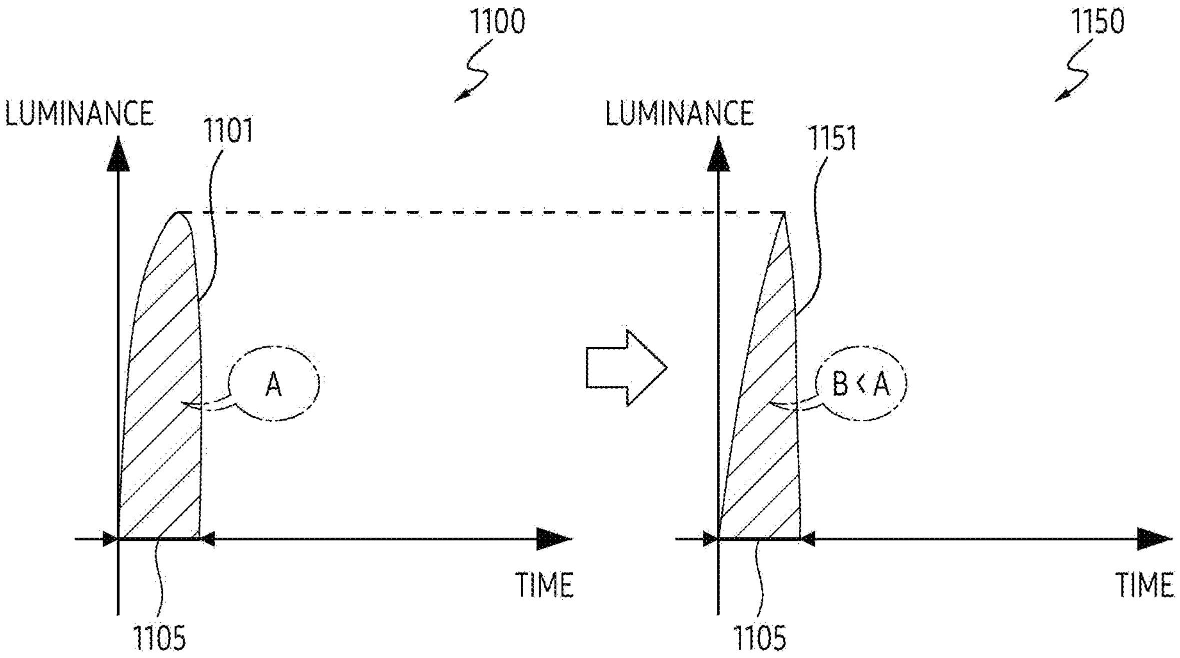
FIG. 11 is a chart illustrating a change in luminance that is changed according to a change in time initializing an anode of a light emitting diode according to an embodiment of the disclosure.

FIG. 11 is a chart illustrating a change in luminance that is changed according to a change in time initializing an anode of a light emitting diode according to an embodiment of the disclosure.

Referring to FIG. 11, a chart 1100 and a chart 1150 indicate a luminance that is changed as time for initializing the anode of the light emitting diode 300 increases. A horizontal axis of each of the chart 1100 and the chart 1150 indicates time, and a vertical axis of each of the chart 1100 and the chart 1150 indicates luminance.

A line 1101 in the chart 1100 indicates a change in luminance provided when the light emitting diode 300 is emitted after initializing the anode for time having the length 913, and a line 1151 in the chart 1100 indicates a change in luminance provided when the light emitting diode 300 is emitted after initializing the anode for time having the length 1013.

As indicated by an integration value A of the line 1101 within a time interval 1105 in the chart 1100 and an integration value B of the line 1151 within the time interval 1105 in the chart 1150 (which is smaller than A), the luminance provided by the light emitting diode 300 being emitted may be reduced as time initializing the anode becomes longer. For example, the electronic device 200 may change the luminance provided from the light emitting diode 300 by changing time initializing the anode using the display driver circuitry 220. For example, the display driver circuitry 220 may control or set the luminance provided from the light emitting diode 300 according to the self-scan to correspond to the luminance provided from the light emitting diode 300 according to the address scan.

Referring back to FIG. 2, the display driver circuitry 220 may adaptively change a method of adjusting the threshold voltage of the first transistor 301 according to a length of time when the image is maintained on the display panel 240. Adaptively changing of the method may be exemplified in the description of FIG. 12.

Figure 12:
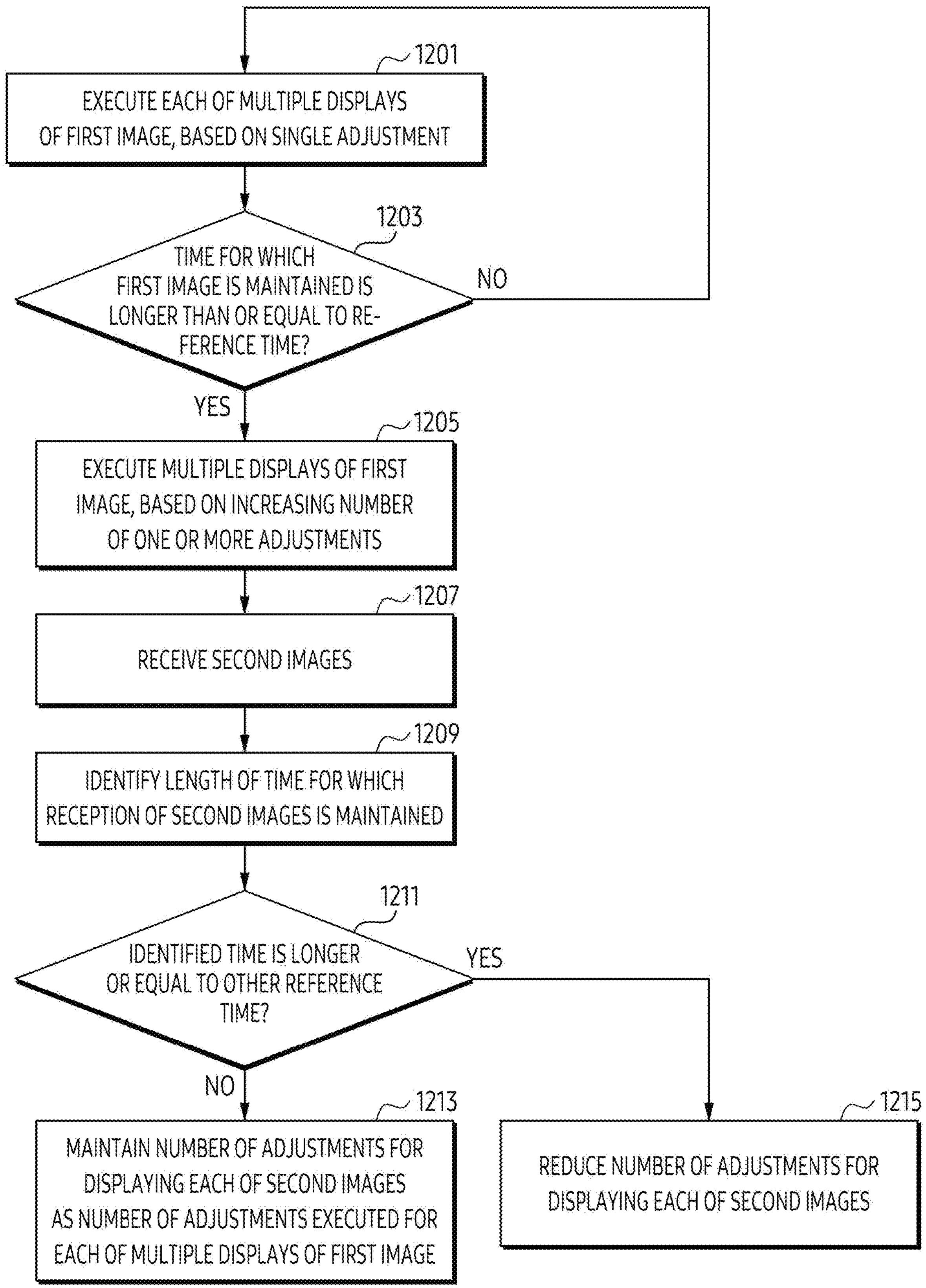
FIG. 12 illustrates a method of setting the number of multiple adjustments according to a length of time during which reception of images is maintained according to an embodiment of the disclosure.

FIG. 12 illustrates a method of setting the number of multiple adjustments according to a length of time during which reception of images is maintained according to an embodiment of the disclosure.

Referring to FIG. 12, in operation 1201, the display driver circuitry 220 may execute each of multiple displays of a first image, based on a single adjustment of the threshold voltage of the first transistor 301. For example, the display driver circuitry 220 may execute the address scan including a single adjustment of initializing the gate electrode of the first transistor 301 and applying a bias voltage (Vbias) to the source electrode of the first transistor 301 in which the gate electrode is initialized, for a first display of the first image from among the multiple displays. For example, the display driver circuitry 220 may execute the self-scan including a single adjustment of applying a bias voltage (Vbias) to the source electrode of the first transistor 301, for a second display of the first image from among the multiple displays. For example, the self-scan may include only one of the one or more adjustments 802.

In operation 1203, the display driver circuitry 220 may identify whether time for which the first image is maintained on the display panel 240 is longer than or equal to a reference time, while the single adjustment is executed for each of the multiple displays. For example, the display driver circuitry 220 may repeatedly execute operation 1201 while the time is shorter than the reference time. For example, the display driver circuitry 220 may execute operation 1205 on a condition that the time is longer than or equal to the reference time.

In operation 1205, the display driver circuitry 220 may execute multiple displays of the first image based on increasing the number of the one or more adjustments 802, in response to the time longer than or equal to the reference time. The multiple displays may be executed based on the self-scan. For example, the display driver circuitry 220 may execute the self-scan including two adjustments, for a first display from among the multiple displays executed in response to time longer than or equal to the reference time. For example, the display driver circuitry 220 may execute the self-scan including three adjustments, for a second display from among the multiple displays in response to time longer than or equal to the reference time. For example, the display driver circuitry 220 may increase the number of the adjustments as the time increases.

In operation 1207, the display driver circuitry 220 may receive, from the processor 210, a second images subsequent to the first image. Although not illustrated in FIG. 12, the display driver circuitry 220 may identify the number of adjustments executed for the first image before the second images are received and display each of the second images by executing the self-scan including the identified number of adjustments.

In operation 1209, the display driver circuitry 220 may identify a length of time for which reception of the second images subsequent to the first image is maintained (continued) while displaying each of the second images by executing the self-scan including the identified number of adjustments. For example, operation 1209 may be executed by the processor 210.

In operation 1211, the display driver circuitry 220 may identify whether the identified time is longer or equal to other reference time. For example, the other reference time may be used to identify whether a content provided by displaying the second images received from the processor 210 is a video. For example, the other reference time may be set to reduce the number of the adjustments when the content is the video. For example, a length of the other reference time may be the same as or different from a length of the reference time. As a non-limiting example, the length of the other reference time may be longer or shorter than the length of the reference time. For example, the display driver circuitry 220 may execute operation 1213 while the time is shorter than the other reference time. For example, the display driver circuitry 220 may execute operation 1215 on a condition that the time is longer than or equal to the other reference time.

In operation 1213, the display driver circuitry 220 may maintain the number of the adjustments for displaying each of the second images as the number of adjustments executed for each of the multiple displays of the first image, while identifying the time shorter than the other reference time. For example, when the number of adjustments executed for each of the multiple displays of the first image is 5, the number of the adjustments for displaying of each of the second images may be 5. However, it is not limited thereto. For example, the display driver circuitry 220 may maintain the number of the adjustments for displaying of each of the second images to reduce occurrence of the afterimage on the display panel 240 due to displaying of each of the second images received after displaying of the first image.

In operation 1215, the display driver circuitry 220 may reduce the number of the adjustments for displaying each of the second images in response to the time longer than or equal to the other reference time. For example, the display driver circuitry 220 may gradually reduce the number of the adjustments executed for displaying each of the second images as time at which the second images are received increases. For example, since continuous reception of the second images indicates that a probability of an afterimage occurring on the display panel 240 decreases, the display driver circuitry 220 may gradually reduce the number of the adjustments.

The operations exemplified through the above descriptions may be executed in the electronic device 200 while a refresh rate provided through the display 215 is lower than a reference refresh rate. For example, the display driver circuitry 220 may cease to execute the multiple adjustments 402 and/or the one or more adjustments 802, based on the refresh rate higher than or equal to the reference refresh rate. For example, the display driver circuitry 220 may display an image according to the address scan that does not include the multiple adjustments 402, based on the refresh rate higher than or equal to the reference refresh rate. For example, the display driver circuitry 220 may display an image according to the self-scan that does not include the one or more adjustments 802, based on the refresh rate higher than or equal to the reference refresh rate. However, it is not limited thereto.

The operations exemplified through the above descriptions may be executed in an electronic device and/or a display module illustrated below.

Figure 13:
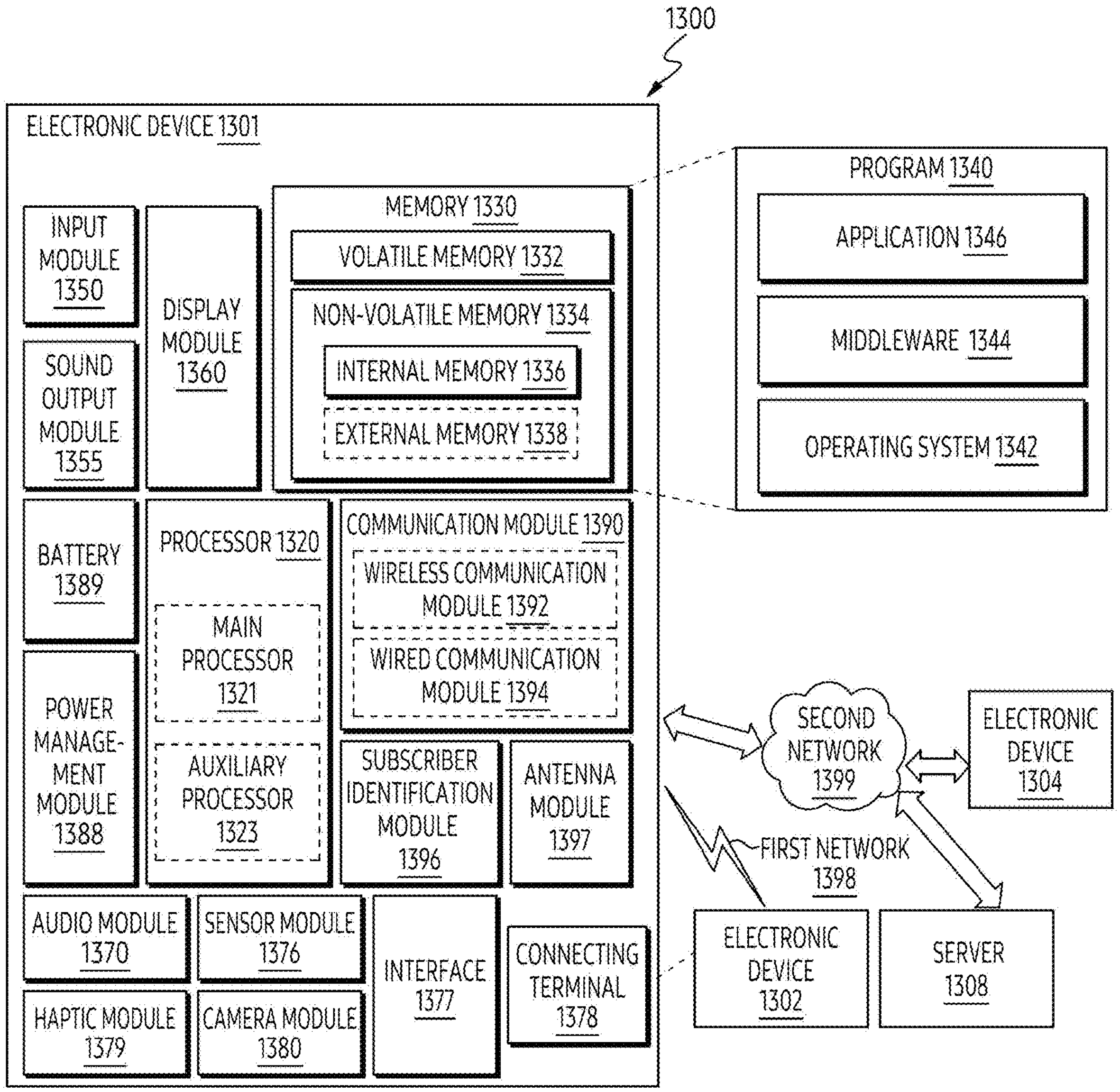
FIG. 13 is a block diagram of an electronic device in a network environment according to an embodiment of the disclosure.

FIG. 13 is a block diagram illustrating an electronic device 1301 in a network environment 1300 according to an embodiment of the disclosure.

Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to an embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™ wireless-fidelity (Wi-Fi) direct, or infrared data association (IrDA)) or the second network 1399 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the millimeter wave (mmWave) band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 1364 dB or less) for implementing mMTC, or U-plane latency (e.g., 0.5 ms or less for each of downlink (DL) and uplink (UL), or a round trip of 13 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302 or 1304, or the server 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

FIG. 14 is a block diagram 1400 illustrating the display module 1360 according to an embodiment of the disclosure.

Referring to FIG. 14, the display module 1360 may include a display 1410 and a display driver integrated circuit (DDI) 1430 to control the display 1410. The DDI 1430 may include an interface module 1431, memory 1433 (e.g., buffer memory), an image processing module 1435, or a mapping module 1437. The DDI 1430 may receive image information that contains image data or an image control signal corresponding to a command to control the image data from another component of the electronic device 1301 via the interface module 1431. For example, according to an embodiment, the image information may be received from the processor 1320 (e.g., the main processor 1321 (e.g., an application processor)) or the auxiliary processor 1323 (e.g., a graphics processing unit) operated independently from the function of the main processor 1321. The DDI 1430 may communicate, for example, with touch circuitry 1450 or the sensor module 1376 via the interface module 1431. The DDI 1430 may also store at least part of the received image information in the memory 1433, for example, on a frame by frame basis. The image processing module 1435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1410. The mapping module 1437 may generate a voltage value or a current value corresponding to the image data pre-processed or post-processed by the image processing module 1435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1410 may be driven, for example, based at least in part on the voltage value or the current value such that visual information (e.g., a text, an image, or an icon) corresponding to the image data may be displayed via the display 1410.

According to an embodiment, the display module 1360 may further include the touch circuitry 1450. The touch circuitry 1450 may include a touch sensor 1451 and a touch sensor IC 1453 to control the touch sensor 1451. The touch sensor IC 1453 may control the touch sensor 1451 to sense a touch input or a hovering input with respect to a certain position on the display 1410. To achieve this, for example, the touch sensor 1451 may detect (e.g., measure) a change in a signal (e.g., a voltage, a quantity of light, a resistance, or a quantity of one or more electric charges) corresponding to the certain position on the display 1410. The touch circuitry 1450 may provide input information (e.g., a position, an area, a pressure, or a time) indicative of the touch input or the hovering input detected via the touch sensor 1451 to the processor 1320. According to an embodiment, at least part (e.g., the touch sensor IC 1453) of the touch circuitry 1450 may be formed as part of the display 1410 or the DDI 1430, or as part of another component (e.g., the auxiliary processor 1323) disposed outside the display module 1360.

According to an embodiment, the display module 1360 may further include at least one sensor (e.g., a fingerprint sensor, an iris sensor, a pressure sensor, or an illuminance sensor) of the sensor module 1376 or a control circuit for the at least one sensor. In such a case, the at least one sensor or the control circuit for the at least one sensor may be embedded in one portion of a component (e.g., the display 1410, the DDI 1430, or the touch circuitry 1450)) of the display module 1360. For example, when the sensor module 1376 embedded in the display module 1360 includes a biometric sensor (e.g., a fingerprint sensor), the biometric sensor may obtain biometric information (e.g., a fingerprint image) corresponding to a touch input received via a portion of the display 1410. As another example, when the sensor module 1376 embedded in the display module 1360 includes a pressure sensor, the pressure sensor may obtain pressure information corresponding to a touch input received via a partial or whole area of the display 1410. According to an embodiment, the touch sensor 1451 or the sensor module 1376 may be disposed between pixels in a pixel layer of the display 1410, or over or under the pixel layer.

The technical problems to be achieved in this document are not limited to those described above, and other technical problems not mentioned herein will be clearly understood by those having ordinary knowledge in the art to which the disclosure belongs, from the following description.

As described above, an electronic device 200 may comprise display driver circuitry 220, and a display panel 240 including a plurality of sub-pixels. Each of the sub-pixels may include a light emitting element (i.e., light emitting diode 300), and a driving transistor 301 configured to obtain a current provided to the light emitting element (i.e., light emitting diode 300). The display driver circuitry 220 may be configured to display a first image on the display panel 240, before the light emitting element (i.e., light emitting diode 300) is emitted for displaying of a second image subsequent to the first image, initialize a gate electrode of the driving transistor 301, and apply a bias voltage to a source electrode of the driving transistor 301 that the gate electrode is initialized, after the bias voltage is applied to the source electrode, initialize the gate electrode again, apply a data voltage to the gate electrode initialized again, and emit the light emitting element (i.e., light emitting diode 300) for the displaying of the second image by providing a current according to the data voltage to the light emitting element (i.e., light emitting diode 300).

Each of the sub-pixels may include a compensation transistor 303 including a source electrode connected to a drain electrode of the driving transistor 301 and a drain electrode connected to the gate electrode of the driving transistor 301. Applying the bias voltage to the source electrode of the driving transistor 301 in each of the multiple adjustments may comprise, while the gate electrode of the driving transistor 301 initialized in each of the multiple adjustments is connected to the drain electrode of the driving transistor 301 through the compensation transistor 303 in accordance with a signal provided from the display driver circuitry 220 to a gate electrode of the compensation transistor 303, apply the bias voltage to the source electrode of the driving transistor 301.

The display driver circuitry 220 may be configured to apply the bias voltage to the source electrode of the driving transistor 301 before the light emitting element (i.e., light emitting diode 300) is emitted for the displaying of the second image.

The display driver circuitry 220 may be configured to apply the bias voltage to the source electrode of the driving transistor 301 while the gate electrode of the driving transistor 301 has the data voltage.

A length of time applying the bias voltage to the source electrode of the driving transistor 301 while the gate electrode of the driving transistor 301 is initialized may be different from a length of time applying the bias voltage to the source electrode of the driving transistor 301 while the gate electrode of the driving transistor 301 has the data voltage.

As described above, an electronic device 200 may comprise display driver circuitry 220, and a display panel 240 including a plurality of sub-pixels. Each of the sub-pixels may include a light emitting diode 300, and a driving transistor 301 configured to obtain a current provided to the light emitting diode 300. The display driver circuitry 220 may be configured to display a first image on the display panel 240, before the light emitting diode 300 is emitted for displaying of a second image subsequent to the first image, execute multiple adjustments of a threshold voltage of the driving transistor 301, wherein each of the multiple adjustments includes initializing a gate electrode of the driving transistor 301, and applying a bias voltage to a source electrode of the driving transistor 301, after the multiple adjustments are executed, initialize the gate electrode, apply a data voltage to the gate electrode initialized after the multiple adjustments are executed, and emit the light emitting diode 300 for the displaying of the second image by providing a current according to the data voltage to the light emitting element (i.e., light emitting diode 300).

Each of the sub-pixels may include a compensation transistor 303 including a source electrode connected to a drain electrode of the driving transistor 301 and a drain electrode connected to the gate electrode of the driving transistor 301. Each of the multiple adjustments may comprise while the gate electrode of the driving transistor 301 initialized in each of the multiple adjustments is connected to the drain electrode of the driving transistor 301 through the compensation transistor 303 in accordance with a signal provided from the display driver circuitry 220 to a gate electrode of the compensation transistor 303, apply the bias voltage to the source electrode of the driving transistor 301.

The display driver circuitry 220 may be configured to, before the multiple adjustments are executed after the displaying of the first image, apply the bias voltage to the source electrode of the driving transistor 301.

The display driver circuitry 220 may be configured to, before the multiple adjustments are executed after the displaying of the first image, while the gate electrode of the driving transistor 301 has a data voltage for the displaying of the first image, apply the bias voltage to the source electrode of the driving transistor 301.

A length of time applying the bias voltage to the source electrode of the driving transistor 301 before the multiple adjustments are executed may be different from a length of time applying the bias voltage to the source electrode of the driving transistor 301 in each of the multiple adjustments.

The display driver circuitry 220 may be configured to, before the light emitting element (i.e., light emitting diode 300) is emitted after the execution of the multiple adjustments, apply the bias voltage to the source electrode of the driving transistor 301.

The display driver circuitry 220 may be configured to apply the bias voltage to the source electrode of the driving transistor 301 while the gate electrode of the driving transistor 301 has the data voltage.

A length of time applying the bias voltage to the source electrode of the driving transistor 301 before the light emitting diode 300 emits light after the execution of the multiple adjustments may be different from a length of time applying the bias voltage to the source electrode of the driving transistor 301 in each of the multiple adjustments.

The display driver circuitry 220 may be configured to execute multiple displays of the second image that comprises a first display of the second image executed in a first time interval based on applying the data volage and a second display of the second image executed in a second time interval subsequent to the first time interval while the gate electrode of the driving transistor 301 has the data voltage, and execute, in the second time interval, one or more adjustments of the threshold voltage each including applying the bias voltage to the source electrode of the driving transistor 301 from among initializing the gate electrode of the driving transistor 301 and applying the bias voltage to the source electrode of the driving transistor 301, for the second display.

The one or more adjustments may be executed before the light emitting element (i.e., light emitting diode 300) is emitted for the second display in the second time interval.

The one or more adjustments may include a first adjustment of the threshold voltage and a second adjustment of the threshold voltage. Time applying the bias voltage in the first adjustment may be different from time applying the bias voltage in the second adjustment.

The display driver circuitry 220 may be configured to, before the multiple adjustments are executed after the displaying of the first image, while the gate electrode of the driving transistor 301 has a data voltage for the displaying of the first image in the first time interval, apply the bias voltage to the source electrode of the driving transistor 301 in the first time interval. A length of time applying the bias voltage to the source electrode of the driving transistor 301 in the first time interval before the multiple adjustments are executed may be different from a length of time applying the bias voltage to the source electrode in an initial adjustment from among the one or more adjustments executed in the second time interval.

The multiple displays may include a third display of the second image executed in a third time interval subsequent to the second time interval while the gate electrode of the driving transistor 301 has the data voltage. The display driver circuitry 220 may be configured to execute, in the third time interval, one or more adjustments of the threshold voltage each including applying the bias voltage to the source electrode of the driving transistor 301 from among initializing the gate electrode of the driving transistor 301 and applying the bias voltage to the source electrode of the driving transistor 301, for the third display. A length of time applying the bias voltage to the source electrode of the driving transistor 301 in an initial adjustment from among the one or more adjustments executed in the third time interval may be different from a length of time applying the bias voltage to the source electrode in an initial adjustment from among the one or more adjustments executed in the second time interval.

The multiple displays may include a third display of the second image executed in a third time interval subsequent to the second time interval while the gate electrode of the driving transistor 301 has the data voltage. The display driver circuitry 220 may be configured to execute, in the third time interval, one or more adjustments of the threshold voltage each including applying the bias voltage to the source electrode of the driving transistor 301 from among initializing the gate electrode of the driving transistor 301 and applying the bias voltage to the source electrode of the driving transistor 301, for the third display. A length of time applying the bias voltage to the source electrode of the driving transistor 301 in a last adjustment from among the one or more adjustments executed in the third time interval is different from a length of time applying the bias voltage to the source electrode in a last adjustment from among the one or more adjustments executed in the second time interval.

The display driver circuitry 220 may be configured to, before the light emitting element (i.e., light emitting diode 300) is emitted in the first time interval after the execution of the multiple adjustments, apply the bias voltage to the source electrode of the driving transistor 301 in the first time interval. A length of time applying the bias voltage to the source electrode of the driving transistor 301 in the first time interval before the light emitting element (i.e., light emitting diode 300) is emitted in the after the execution of the multiple adjustments may be different from a length of time applying the bias voltage to the source electrode of the driving transistor 301 in a last adjustment from among the one or more adjustments executed in the second time interval.

The display driver circuitry 220 may be configured to refrain from initializing the gate electrode of the driving transistor 301 within the second time interval.

The multiple adjustments may include a first adjustment of the threshold voltage and a second adjustment of the threshold voltage subsequent to the first adjustment. The first adjustment may include initializing the gate electrode having a data voltage used for the displaying of the first image, and applying the bias voltage to the source electrode of the driving transistor 301 in response to the initializing of the gate electrode in the first adjustment. The second adjustment may include initializing the gate electrode having a voltage according to the bias voltage to the source electrode of the driving transistor 301 within the first adjustment, and applying the bias voltage to the source electrode of the driving transistor 301 in response to the initializing of the gate electrode within the second adjustment.

Each of the plurality of sub-pixels may include a bypass transistor 307 connected to an anode of the light emitting diode 300. The display driver circuitry 220 may be configured to initialize the anode through the bypass transistor while applying the bias voltage to the source electrode of the driving transistor 301 within each of the multiple adjustments.

The display driver circuitry 220 may be configured to execute multiple displays of the second image including a first display of the second image executed within the first time interval, based on executing the multiple adjustments within the first time interval and applying the data voltage, and a second display of the second image within a second time interval subsequent to the first time interval executed while the gate electrode of the driving transistor 301 has the data voltage applied within the first time interval, before the multiple adjustments are executed within the first time interval after the displaying of the first image, while the gate electrode of the driving transistor 301 has a data voltage for the displaying of the first image within the first time interval, Initialize the anode through the bypass transistor within the first time interval, and apply the bias voltage to the source electrode of the driving transistor 301, and execute, within the second time interval, one or more adjustments of the threshold voltage each including applying the bias voltage to the source electrode of the driving transistor 301 from among initializing the gate electrode of the driving transistor 301 and applying the bias voltage to the source electrode of the driving transistor 301, for the second display. A length of time initializing the anode within the first time interval before the multiple adjustments are executed may be different from a length of time initializing the anode within an initial adjustment from among the one or more adjustments executed within the second time interval.

The display driver circuitry 220 may be configured to execute multiple displays of the second image including a first display of the second image executed within the first time interval, based on executing the multiple adjustments within the first time interval and applying the data voltage, and a second display of the second image within a second time interval subsequent to the first time interval executed while the gate electrode of the driving transistor 301 has the data voltage applied within the first time interval, before the light emitting diode 300 is emitted within the first time interval after the execution of the multiple adjustments, Initialize the anode through the bypass transistor within the first time interval, and apply the bias voltage to the source electrode of the driving transistor 301, and execute, within the second time interval, one or more adjustments of the threshold voltage each including applying the bias voltage to the source electrode of the driving transistor 301 from among initializing the gate electrode of the driving transistor 301 and applying the bias voltage to the source electrode of the driving transistor 301, for the second display. A length of time initializing the anode within the first time interval before the light emitting diode 300 is emitted within the first time interval after the execution of the multiple adjustments may be different from a length of time initializing the anode within a last adjustment from among the one or more adjustments executed within the second time interval.

The electronic device 200 may include a processor 210. The display driver circuitry 220 may be configured to, while the second image is maintained on the display panel 240, receive third images subsequent to the second image from the processor, before the light emitting diode 300 is emitted for displaying of each of the third images, execute the multiple adjustments for the displaying of each of the third images, identify a length of time that receiving of the third images is maintained, in response to the length shorter than a reference length, maintain the number of the multiple adjustments executed for the displaying of each of the third images as the number of the multiple adjustments executed for the displaying of the second image, and in response to the length longer than or equal to the reference length, reduce the number of the multiple adjustments executed for the displaying of the third image.

The effects that can be obtained from the disclosure are not limited to those described above, and any other effects not mentioned herein will be clearly understood by those having ordinary knowledge in the art to which the disclosure belongs, from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

display driver circuitry; and a display panel including a plurality of sub-pixels, wherein each of the sub-pixels includes:

a light emitting element, and a driving transistor configured to obtain a current provided to the light emitting element, and wherein the display driver circuitry is configured to:

display a first image on the display panel, before the light emitting element emits for displaying of a second image subsequent to the first image, initialize a gate electrode of the driving transistor, and apply a bias voltage to a source electrode of the driving transistor that the gate electrode is initialized, after the bias voltage is applied to the source electrode, initialize the gate electrode again, apply a data voltage to the gate electrode initialized again, and cause the light emitting element to emit light for the displaying of the second image by providing a current according to the data voltage to the light emitting element.

2. The electronic device of claim 1, wherein the display driver circuitry is configured to:

for executing each of multiple adjustments of a threshold voltage of the driving transistor before the light emitting element emits for the displaying of the second image, initialize the gate electrode of the driving transistor, and apply the bias voltage to the source electrode of the driving transistor that the gate electrode is initialized.

3. The electronic device of claim 2, wherein each of the sub-pixels further includes a compensation transistor including a source electrode connected to a drain electrode of the driving transistor and a drain electrode connected to the gate electrode of the driving transistor, and wherein applying the bias voltage to the source electrode of the driving transistor in each of the multiple adjustments comprises:

while the gate electrode of the driving transistor initialized in each of the multiple adjustments is connected to the drain electrode of the driving transistor through the compensation transistor in accordance with a signal provided from the display driver circuitry to a gate electrode of the compensation transistor, applying the bias voltage to the source electrode of the driving transistor.

4. The electronic device of claim 3, wherein the display driver circuitry is configured to:

while the gate electrode of the driving transistor has the data voltage, apply the bias voltage to the source electrode of the driving transistor.

5. The electronic device of claim 3, wherein a length of time applying the bias voltage to the source electrode of the driving transistor while the gate electrode of the driving transistor is initialized is different from a length of time applying the bias voltage to the source electrode of the driving transistor while the gate electrode of the driving transistor has the data voltage.

6. The electronic device of claim 2, wherein the display driver circuitry is configured to:

before the multiple adjustments are executed after the displaying of the first image, apply the bias voltage to the source electrode of the driving transistor.

7. The electronic device of claim 6, wherein the display driver circuitry is configured to:

before the multiple adjustments are executed after the displaying of the first image, while the gate electrode of the driving transistor has a data voltage for the displaying of the first image, apply the bias voltage to the source electrode of the driving transistor.

8. The electronic device of claim 2, wherein the display driver circuitry is further configured to:

before the light emitting element emits after the execution of the multiple adjustments, apply the bias voltage to the source electrode of the driving transistor.

9. The electronic device of claim 2, wherein the display driver circuitry is further configured to:

execute multiple displays of the second image that comprises a first display of the second image executed in a first time interval based on applying data volage and a second display of the second image executed in a second time interval subsequent to the first time interval while the gate electrode of the driving transistor has the data voltage; and execute, in the second time interval, one or more adjustments of the threshold voltage each including applying the bias voltage to the source electrode of the driving transistor from among initializing the gate electrode of the driving transistor and applying the bias voltage to the source electrode of the driving transistor, for the second display.

10. The electronic device of claim 9, wherein the one or more adjustments are executed before the light emitting element emits for the second display in the second time interval.

11. The electronic device of claim 9, wherein the one or more adjustments include a first adjustment of the threshold voltage and a second adjustment of the threshold voltage, and wherein time applying the bias voltage in the first adjustment is different from time applying the bias voltage in the second adjustment.

12. The electronic device of claim 9, wherein the display driver circuitry is configured to:

before the multiple adjustments are executed after the displaying of the first image, while the gate electrode of the driving transistor has a data voltage for the displaying of the first image in the first time interval, apply the bias voltage to the source electrode of the driving transistor in the first time interval, and wherein a length of time applying the bias voltage to the source electrode of the driving transistor in the first time interval before the multiple adjustments are executed is different from a length of time applying the bias voltage to the source electrode in an initial adjustment from among the one or more adjustments executed in the second time interval.

13. The electronic device of claim 9, wherein the multiple displays further include a third display of the second image executed in a third time interval subsequent to the second time interval while the gate electrode of the driving transistor has the data voltage, wherein the display driver circuitry is further configured to:

execute, in the third time interval, one or more adjustments of the threshold voltage each including applying the bias voltage to the source electrode of the driving transistor from among initializing the gate electrode of the driving transistor and applying the bias voltage to the source electrode of the driving transistor, for the third display, and wherein a length of time applying the bias voltage to the source electrode of the driving transistor in an initial adjustment from among the one or more adjustments executed in the third time interval is different from a length of time applying the bias voltage to the source electrode in an initial adjustment from among the one or more adjustments executed in the second time interval.

14. The electronic device of claim 9, wherein the multiple displays further include a third display of the second image executed in a third time interval subsequent to the second time interval while the gate electrode of the driving transistor has the data voltage, wherein the display driver circuitry is further configured to:

execute, in the third time interval, one or more adjustments of the threshold voltage each including applying the bias voltage to the source electrode of the driving transistor from among initializing the gate electrode of the driving transistor and applying the bias voltage to the source electrode of the driving transistor, for the third display, and wherein a length of time applying the bias voltage to the source electrode of the driving transistor in a last adjustment from among the one or more adjustments executed in the third time interval is different from a length of time applying the bias voltage to the source electrode in a last adjustment from among the one or more adjustments executed in the second time interval.

15. The electronic device of claim 9, wherein the display driver circuitry is further configured to:

before the light emitting element emits in the first time interval after the execution of the multiple adjustments, apply the bias voltage to the source electrode of the driving transistor in the first time interval, and wherein a length of time applying the bias voltage to the source electrode of the driving transistor in the first time interval before the light emitting element emits in the first time interval after the execution of the multiple adjustments is different from a length of time applying the bias voltage to the source electrode of the driving transistor in a last adjustment from among the one or more adjustments executed in the second time interval.

16. The electronic device of claim 9, wherein the display driver circuitry is configured to refrain from initializing the gate electrode of the driving transistor within the second time interval.

17. The electronic device of claim 9, wherein the multiple adjustments include a first adjustment of the threshold voltage and a second adjustment of the threshold voltage subsequent to the first adjustment, wherein the first adjustment includes initializing the gate electrode having a data voltage used for the displaying of the first image, and applying the bias voltage to the source electrode of the driving transistor in response to the initializing of the gate electrode in the first adjustment, and wherein the second adjustment includes initializing the gate electrode having a voltage according to the bias voltage to the source electrode of the driving transistor within the first adjustment, and applying the bias voltage to the source electrode of the driving transistor in response to the initializing of the gate electrode within the second adjustment.

18. The electronic device of claim 9, wherein each of the sub-pixels includes a bypass transistor connected to an anode of the light emitting element, and wherein the display driver circuitry is configured to initialize the anode through the bypass transistor while applying the bias voltage to the source electrode of the driving transistor within each of the multiple adjustments.

19. The electronic device of claim 18, wherein the display driver circuitry is configured to:

execute multiple displays of the second image including:

a first display of the second image executed within the first time interval, based on executing the multiple adjustments within the first time interval and applying the data voltage, and a second display of the second image within a second time interval subsequent to the first time interval executed while the gate electrode of the driving transistor has the data voltage applied within the first time interval;

before the multiple adjustments are executed within the first time interval after the displaying of the first image, while the gate electrode of the driving transistor has a data voltage for the displaying of the first image within the first time interval:

initialize the anode through the bypass transistor within the first time interval, and apply the bias voltage to the source electrode of the driving transistor; and execute, within the second time interval, one or more adjustments of the threshold voltage each including applying the bias voltage to the source electrode of the driving transistor from among initializing the gate electrode of the driving transistor and applying the bias voltage to the source electrode of the driving transistor, for the second display, and wherein a length of time initializing the anode within the first time interval before the multiple adjustments are executed is different from a length of time initializing the anode within an initial adjustment from among the one or more adjustments executed within the second time interval.

20. The electronic device of claim 18, wherein the display driver circuitry is configured to:

execute multiple displays of the second image including:

a first display of the second image executed within the first time interval, based on executing the multiple adjustments within the first time interval and applying the data voltage, and a second display of the second image within a second time interval subsequent to the first time interval executed while the gate electrode of the driving transistor has the data voltage applied within the first time interval;

before the light emitting element emits within the first time interval after the execution of the multiple adjustments:

initialize the anode through the bypass transistor within the first time interval, and apply the bias voltage to the source electrode of the driving transistor; and execute, within the second time interval, one or more adjustments of the threshold voltage each including applying the bias voltage to the source electrode of the driving transistor from among initializing the gate electrode of the driving transistor and applying the bias voltage to the source electrode of the driving transistor, for the second display, and wherein a length of time initializing the anode within the first time interval before the light emitting element emits within the first time interval after the execution of the multiple adjustments is different from a length of time initializing the anode within a last adjustment from among the one or more adjustments executed within the second time interval.

* * * * *